United States Patent
Sharma et al.

(10) Patent No.: US 11,210,495 B2
(45) Date of Patent: Dec. 28, 2021

(54) SYSTEMS, METHODS AND COMPUTER-ACCESSIBLE MEDIUMS FOR AUTHENTICATION AND VERIFICATION OF PHYSICAL OBJECTS

(75) Inventors: Ashlesh Sharma, Redmond, WA (US); Lakshminarayanan Subramanian, New York, NY (US); Eric Brewer, Mill Valley, CA (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/005,643

(22) PCT Filed: Mar. 19, 2012

(86) PCT No.: PCT/US2012/029692
§ 371 (c)(1),
(2), (4) Date: Apr. 1, 2014

(87) PCT Pub. No.: WO2012/126008
PCT Pub. Date: Sep. 20, 2012

(65) Prior Publication Data
US 2014/0205153 A1    Jul. 24, 2014

Related U.S. Application Data

(60) Provisional application No. 61/453,916, filed on Mar. 17, 2011.

(51) Int. Cl.
*G06K 9/00*    (2006.01)
*G07D 7/2033*   (2016.01)
(Continued)

(52) U.S. Cl.
CPC ..... *G06K 9/00147* (2013.01); *G06K 9/00577* (2013.01); *G07D 7/2033* (2013.01);
(Continued)

(58) Field of Classification Search
CPC ............... G06K 9/00577; G07D 7/2033
See application file for complete search history.

(56) References Cited

U.S. PATENT DOCUMENTS 3,636,513 A * 1/1972 Tisdale ............... G06K 9/6211
                                                         382/204
4,634,148 A * 1/1987 Greene ................ B42D 15/00
                                                         235/468
(Continued)

FOREIGN PATENT DOCUMENTS

CN       101057448 B    2/2012
JP       2000-149087 A  5/2000
(Continued)

OTHER PUBLICATIONS

Kamarainen, Joni-Kristian et al,. "Invariance Properties of Gabor Filter Base Features—Overview and Applications", IEEE Transactions on Image Processing, vol. 15 No. 5, May 2006, p. 1088-1099.*
(Continued)

*Primary Examiner* — Gandhi Thirugnanam
(74) *Attorney, Agent, or Firm* — Hunton Andrews Kurth LLP

(57) ABSTRACT

Exemplary methodology, procedure, system, method and computer-accessible medium can be provided for authenticating a non-digital medium of a physical object, by receiving at least one image of video of at least one marked or unmarked region, and comparing the first microscopic image or video of at least one marked or unmarked region with at least one second microscopic image or video relating to the non-digital medium to determine if a similarity between the first and second microscopic images or videos matches or exceeds a predetermined amount.

34 Claims, 14 Drawing Sheets

(51) Int. Cl.
*G09C 1/00* (2006.01)
*G09C 5/00* (2006.01)
*H04L 9/32* (2006.01)

(52) U.S. Cl.
CPC .............. *G09C 1/00* (2013.01); *G09C 5/00* (2013.01); *H04L 9/3278* (2013.01); *H04L 2209/12* (2013.01)

(56) References Cited

U.S. PATENT DOCUMENTS

| | | | | |
|---|---|---|---|---|
| 5,193,854 | A * | 3/1993 | Borowski, Jr. | A63F 3/0685 283/87 |
| 5,325,167 | A * | 6/1994 | Melen | G06K 9/00 235/380 |
| 6,038,016 | A * | 3/2000 | Jung | A61C 19/10 356/71 |
| 6,068,895 | A * | 5/2000 | Kimura | D01F 1/10 428/29 |
| 6,107,244 | A * | 8/2000 | Zeira | B41M 3/144 503/201 |
| 6,155,604 | A * | 12/2000 | Greene | B41M 3/144 235/491 |
| 6,192,150 | B1 * | 2/2001 | Leow | G06F 17/30262 382/181 |
| 6,819,775 | B2 | 11/2004 | Amidror et al. | |
| 7,089,420 | B1 * | 8/2006 | Durst | G09C 5/00 283/72 |
| 7,162,035 | B1 * | 1/2007 | Durst | G06K 19/086 380/54 |
| 7,529,387 | B2 * | 5/2009 | Kotake | G06K 9/32 382/103 |
| 7,802,669 | B2 * | 9/2010 | Irie | G07D 5/005 194/328 |
| 7,995,196 | B1 * | 8/2011 | Fraser | G06K 9/00577 356/71 |
| 2001/0033688 | A1 * | 10/2001 | Taylor | G06K 17/0032 382/181 |
| 2002/0009208 | A1 * | 1/2002 | Alattar | G06F 17/30876 382/100 |
| 2002/0012447 | A1 * | 1/2002 | Amidror | G07D 7/128 382/100 |
| 2005/0084275 | A1 | 4/2005 | Maeyama et al. | |
| 2005/0127187 | A1 * | 6/2005 | Auslander | G06K 7/12 235/491 |
| 2006/0147095 | A1 * | 7/2006 | Usher | G06K 9/00604 382/117 |
| 2007/0028093 | A1 * | 2/2007 | Cowburn | G06K 9/00577 713/155 |
| 2007/0041628 | A1 * | 2/2007 | Fan | H04N 1/00867 382/135 |
| 2008/0231865 | A1 | 9/2008 | Schwarz et al. | |
| 2009/0006855 | A1 * | 1/2009 | Tuyls | H04L 9/3218 713/182 |
| 2010/0067691 | A1 * | 3/2010 | Lin | H04N 1/32144 380/55 |
| 2010/0195916 | A1 * | 8/2010 | Blondiaux | G06K 19/086 382/209 |
| 2010/0228576 | A1 * | 9/2010 | Marti | G06K 5/00 705/5 |
| 2010/0310182 | A1 * | 12/2010 | Kroepfl | G06K 9/00624 382/216 |
| 2010/0327060 | A1 * | 12/2010 | Moran | G06K 7/0004 235/440 |
| 2011/0228069 | A1 | 9/2011 | Mimura et al. | |
| 2012/0051656 | A1 * | 3/2012 | Wang | G06T 7/246 382/201 |
| 2012/0128241 | A1 * | 5/2012 | Jung | H04N 21/84 382/165 |
| 2012/0178469 | A1 * | 7/2012 | Grzechnik | G01C 21/20 455/456.1 |
| 2012/0189171 | A1 * | 7/2012 | Abiko | G06K 9/0008 382/115 |
| 2012/0224750 | A1 * | 9/2012 | Rosqvist | G06K 9/00093 382/125 |
| 2012/0253810 | A1 * | 10/2012 | Sutton | G10L 17/24 704/246 |
| 2013/0004059 | A1 * | 1/2013 | Said | G06T 7/0028 382/154 |
| 2014/0092244 | A1 * | 4/2014 | Tang | G06F 16/7837 348/143 |
| 2014/0169617 | A1 * | 6/2014 | Pollard | H04N 1/32101 382/100 |
| 2014/0205153 | A1 * | 7/2014 | Sharma | G06K 9/00577 382/109 |
| 2015/0016723 | A1 * | 1/2015 | Francini | G06K 9/6211 382/170 |
| 2016/0012643 | A1 * | 1/2016 | Kezele | G02B 27/0093 345/633 |
| 2016/0078289 | A1 * | 3/2016 | Michel | G06K 9/00355 345/156 |

FOREIGN PATENT DOCUMENTS

| | | |
|---|---|---|
| JP | 2004-294426 A | 10/2004 |
| JP | 2008-256684 | 10/2008 |
| JP | 2010-022318 | 2/2010 |
| WO | WO 2002/023481 | 3/2002 |
| WO | WO 2009/115611 A2 | 9/2009 |
| WO | WO 2009/149408 | 12/2009 |

OTHER PUBLICATIONS

Ke et al. "PCA-SIFT: A More Distinctive Representation for Local Image Descriptors", 2004, http://www.cs.cmu.edu/~rahuls/pub/cvpr2004-keypoint-rahuls.pdf, p. 1-8.*

Supplementary European Search Report for Application No. 12757221 dated Mar. 20, 2015.

Ashlesh Sharma et al., "Secure rural supply chain management using low cost paper watermarking", Proceedings of the Second ACM SIGCOMM Workshop on, NSDR 1 08. (2008), p. 19.

Ashlesh Sharma et al, "PaperSpecke, Microscopic Fingerprinting of Paper" Computer and Communications Security, ACM, USA, (2011), pp. 99-110.

Jehanzeb Abbas et al: "People in videos from people in pictures", Proceedings of SPIE, vol. 6788, (2007), p. 67880S-67880S-7.

International Search Report for PCT/US2012/029692 dated Sep. 21, 2012.

International Written Opinion for PCT/US2012/029692 dated Sep. 21, 2012.

First Office Action and Search Report for Chinese Patent Application No. 201280020736.4 dated Sep. 29, 2014.

Final Refusal Notice dated Oct. 25, 2016 for Japanese Patent Application No. 2013-558240.

European Office Action for Patent Application No. 12757221.2 dated May 23, 2016.

First Office Action Japanese Patent Application No. dated Feb. 3, 2016.

Notification of the First Chinese Office Action dated Feb. 14, 2018 for Chinese Patent Application No. 201510614058.X.

Notice of Grounds for Rejection dated Feb. 26, 2018 for Korean Patent Application No. 10-2013-7027276.

Notice of Allowance dated May 30, 2016 for Japanese Patent Application No. 2013-558240.

Provision of a copy of the minutes in accordance with Rule 124(4) EPC dated Oct. 26, 2017 for European Patent Application No. 12757221.2.

Summons to attend Oral Proceedings pursuant to Rule 115(1) EPC dated Mar. 29, 2017 for European Patent Application No. 12757221.2.

Notice of Grounds for Rejection dated Dec. 26, 2018 for Korean Patent Application No. 10-2013-7027276.

Notice of Grounds for Rejection dated Feb. 26, 2019 for Korean Patent Application No. 10-2013-7027276.

* cited by examiner

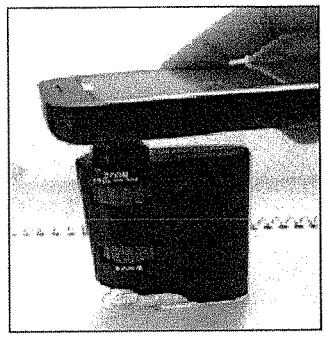
FIG. 1
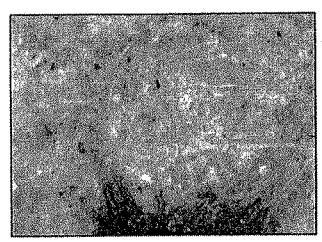 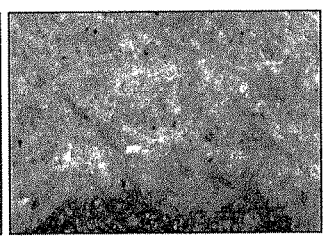
FIG. 2(a)   FIG. 2(b)
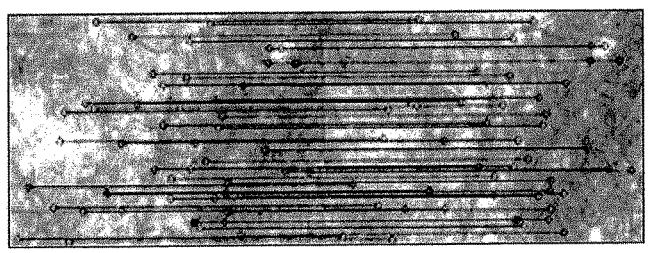
FIG. 3(a)
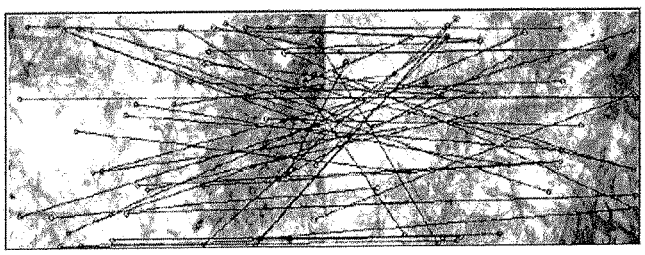
FIG. 3(b)

|  | Level 1 | Level 2 | Level 3 | Level 4 | Level 5 |
|---|---|---|---|---|---|
| Speckle 1 | 0.4742 | 0.4651 | 0.4781 | 0.4132 | 0.3982 |
| Speckle 2 | 0.4892 | 0.4745 | 0.4622 | 0.4323 | 0.4120 |
| Speckle 3 | 0.4782 | 0.4612 | 0.4209 | 0.4329 | 0.4293 |
| Speckle 4 | 0.4901 | 0.4816 | 0.4778 | 0.4512 | 0.4377 |

FIG. 7

|  | Level 1 | Level 2 | Level 3 | Level 4 | Level 5 |
|---|---|---|---|---|---|
| Instance 1 | 0.4656 | 0.4793 | 0.4123 | 0.3128 | 0.1254 |
| Instance 2 | 0.4755 | 0.4432 | 0.3754 | 0.2322 | 0.0994 |
| Instance 3 | 0.4601 | 0.4212 | 0.2947 | 0.2102 | 0.0864 |
| Instance 4 | 0.4777 | 0.4233 | 0.2942 | 0.1904 | 0.1023 |

FIG 8

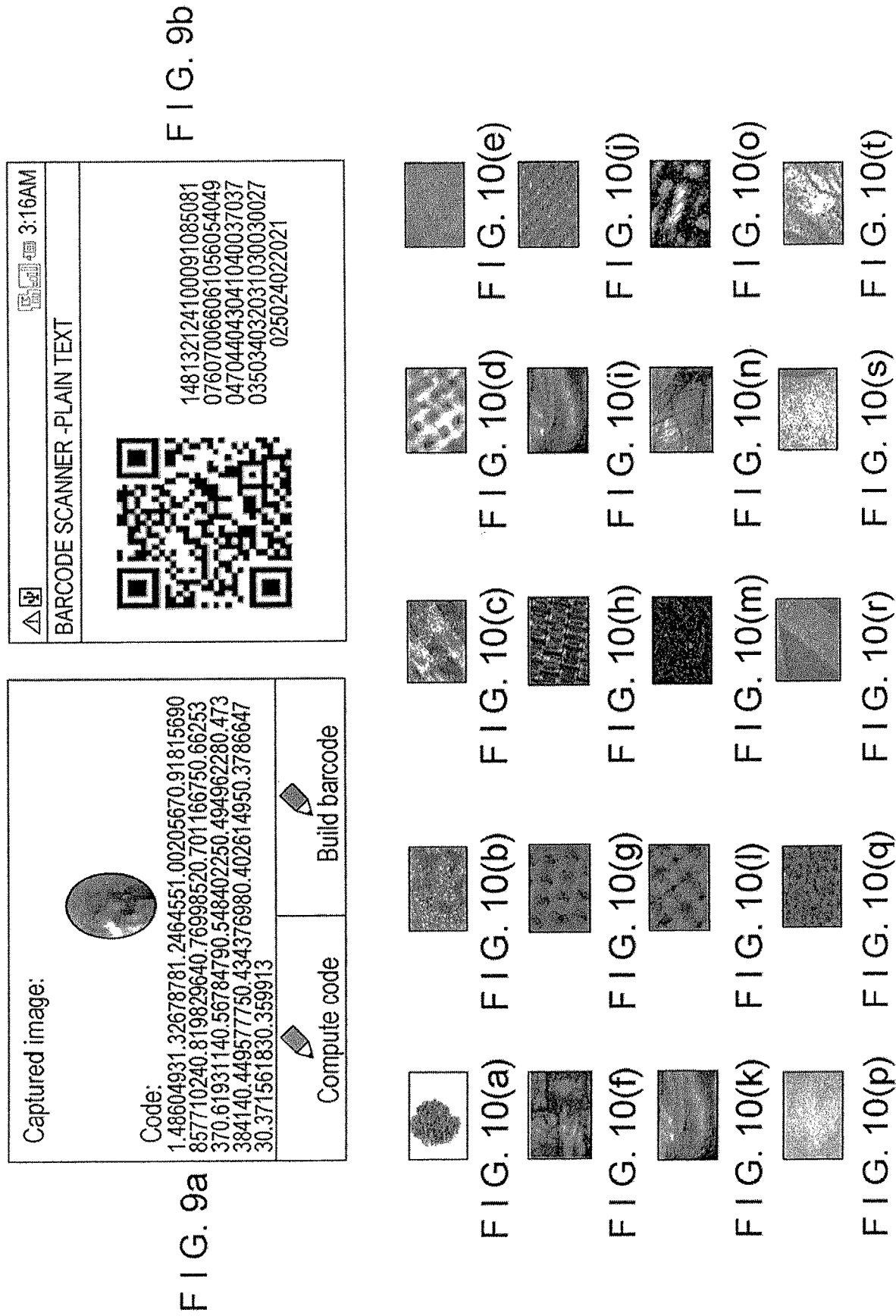

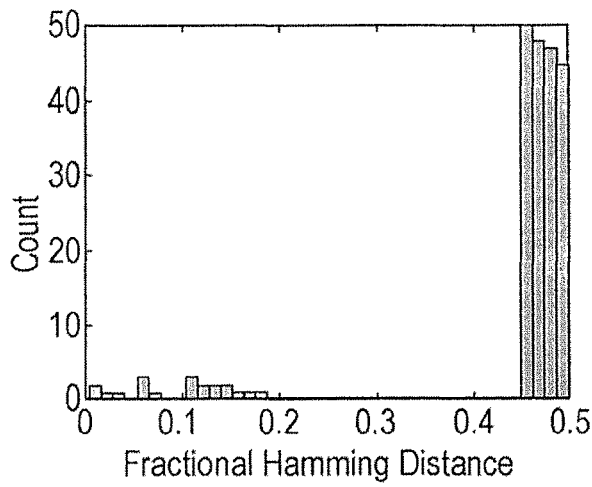
F I G. 11(g)
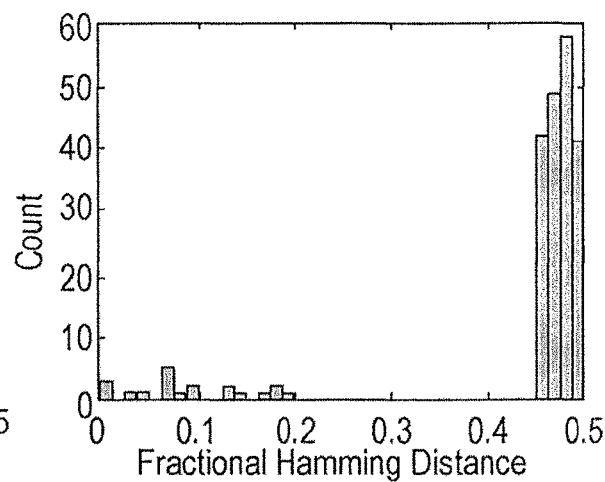
F I G. 11(h)
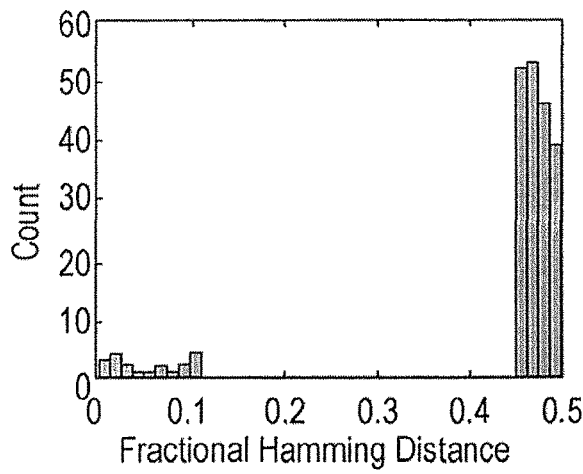
F I G. 11(i)
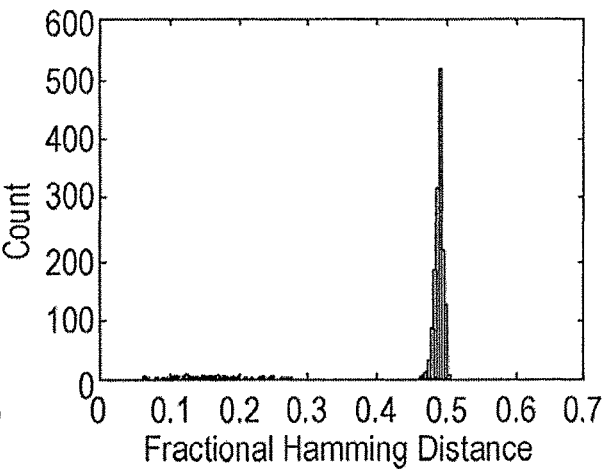
F I G. 11(j)
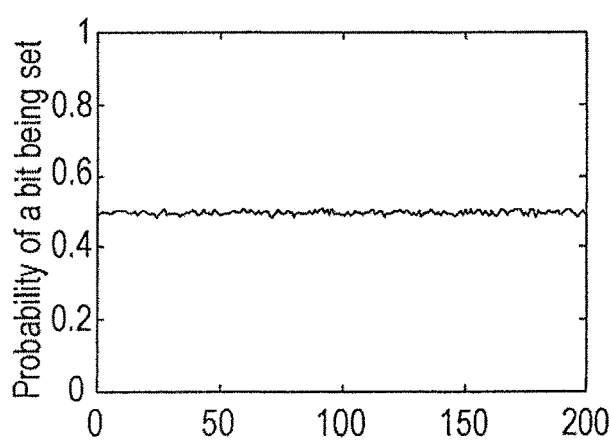
F I G. 11(k)
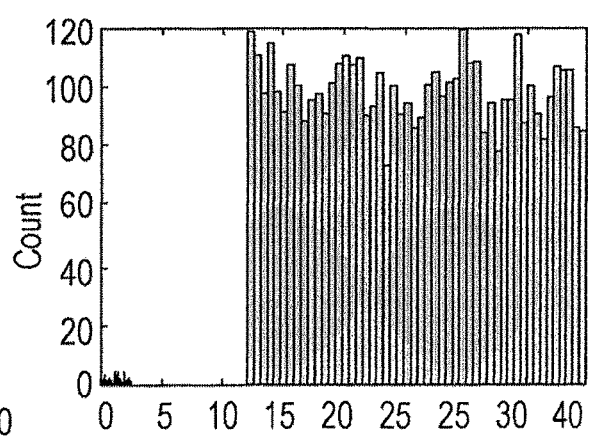
F I G. 11(l)

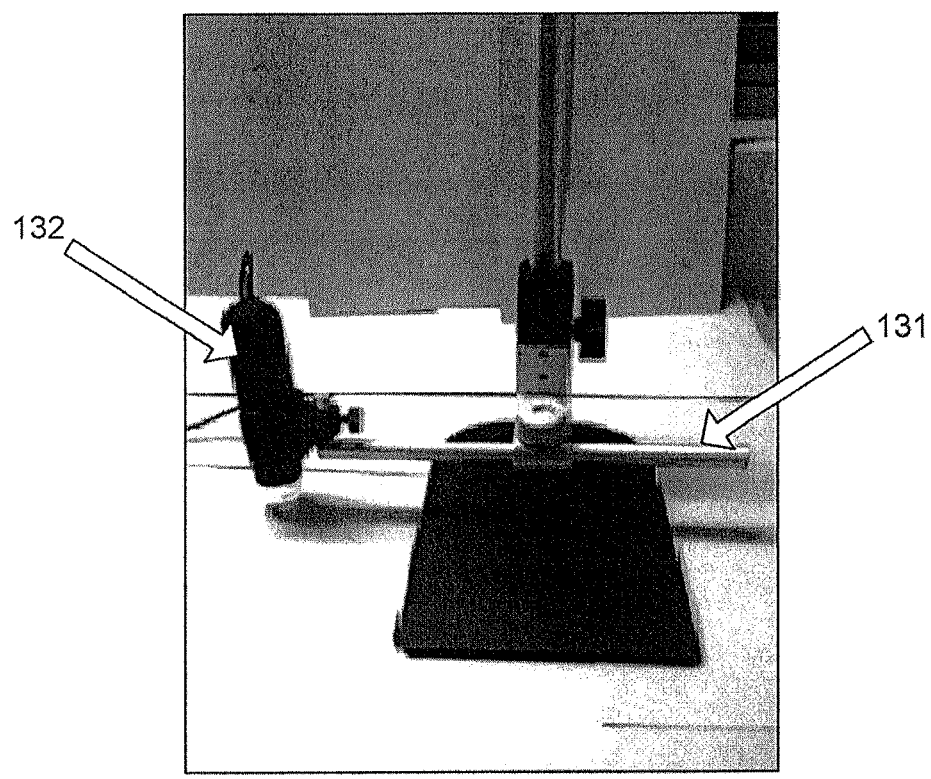
F I G. 13

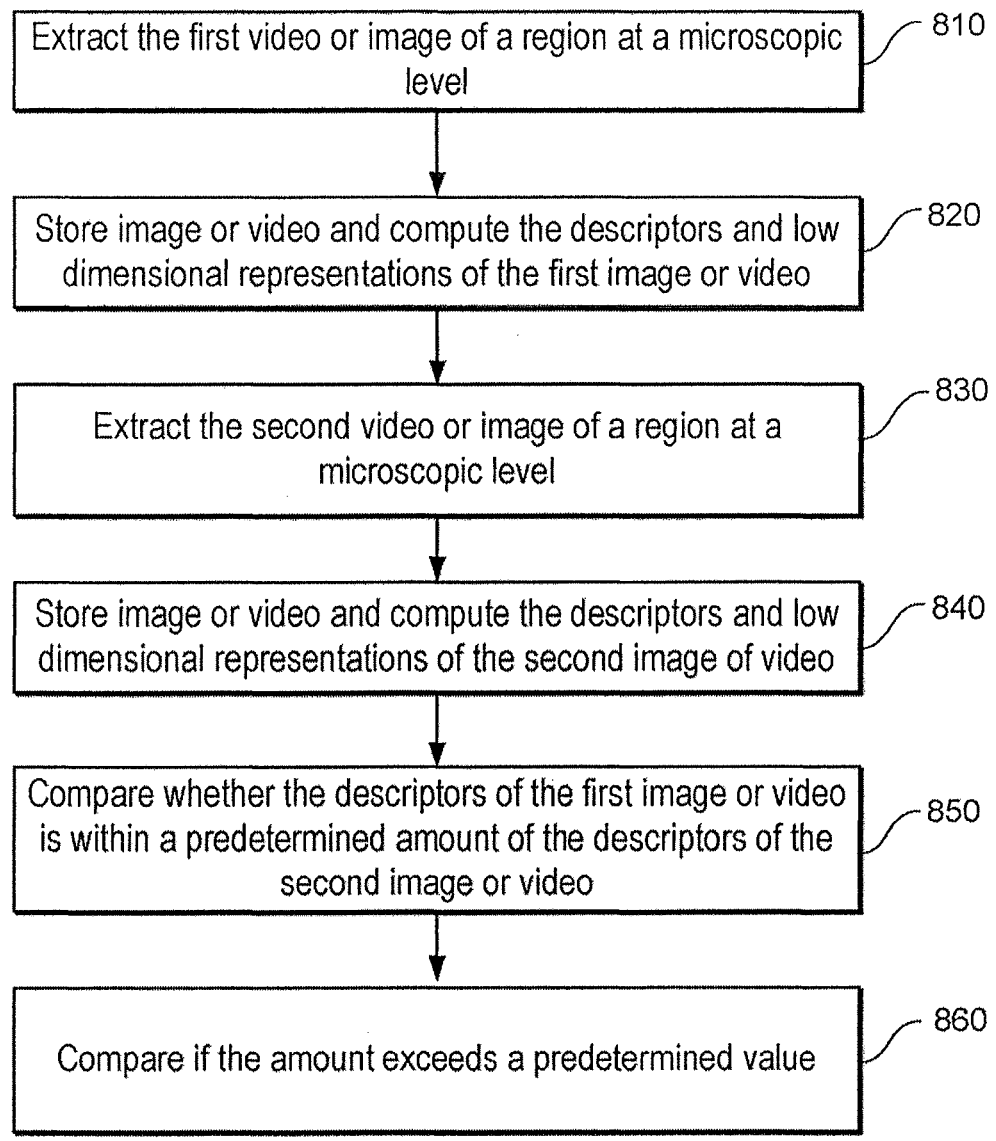
F I G. 14

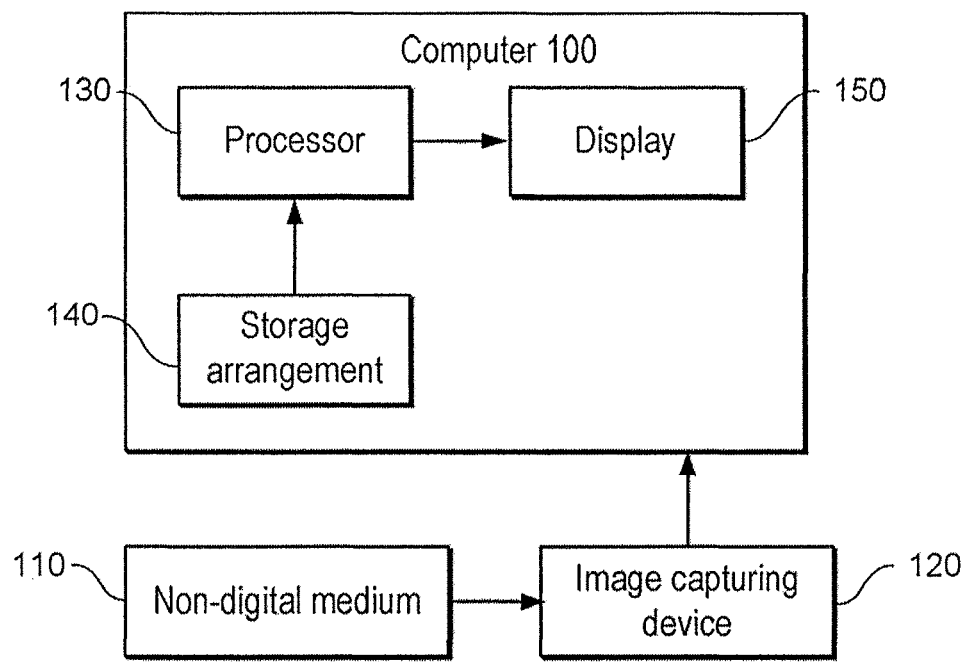
F I G. 15
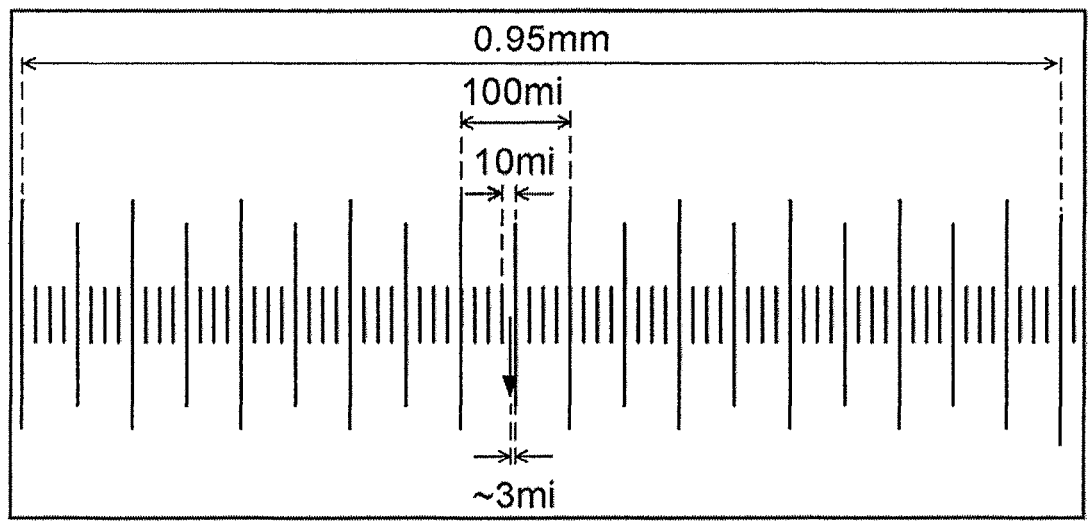
F I G. 16
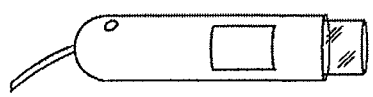
F I G. 17

SYSTEMS, METHODS AND COMPUTER-ACCESSIBLE MEDIUMS FOR AUTHENTICATION AND VERIFICATION OF PHYSICAL OBJECTS

CROSS-REFERENCE TO RELATED APPLICATIONS

This present application relates to and claims the benefit of priority to International Patent Application No. PCT/US2012/029692 filed on Mar. 19, 2012, and claims priority from U.S. Patent Application No. 61/453,916, filed on Mar. 17, 2011, the entire disclosures of which are hereby incorporated herein by reference.

FIELD OF THE DISCLOSURE

The present disclosure relates to exemplary embodiments of systems, methods and computer-accessible mediums for authentication and verification of physical objects using, e.g., microscopic images and videos.

BACKGROUND INFORMATION

Identification and classification of textures has been a domain of research over the years in computer graphics. The CUReT database lists over 60 texture samples and tries to infer irradiance, illumination directions and provides accurate BRDF measurements of the textures, with the goal of accurately determining the properties of the textures so that they could realistically render, identify, classify textures in a more efficient manner.

There have been several publications that have discussed studies of scattering properties of textures such as Birectional Texture Function, subsurface scattering and radiative transport in materials. Some works study light transport in scattering media and try to reconstruct the scene from photographs. Volumetric rendering of cloth, fabric from micro three-dimensional ("3D") CT scans have been achieved and microscopic 3D structure rendering using gel based devices are being performed. Scanning electron microscopy is used to study the structure of materials at sub-micron levels and 3D reconstruction from of mesostructure from specular reflections of objects is achieved. Recently, researchers proposed a technique to identify paper using low-dimensional representation of its physical characteristics. But, their technique applies only to paper and does not extend to other materials.

Counterfeit goods and documents are major problems in several countries around the world. The estimated market loss in counterfeit art, paper, documents, clothing, plastic cards (e.g., credit cards, debit cards, id cards), and auto parts is more than $100 billion. However, none of the above mentioned publications describe individually identifying textures, e.g., at a microscopic level; nor a low cost techniques, systems and devices to uniquely identify each piece(s) of texture.

Accordingly, at least one of the objects of the present disclosure is to address at least some of these deficiencies and issues.

SUMMARY OF EXEMPLARY EMBODIMENTS OF THE DISCLOSURE

Exemplary embodiments of the present disclosure relate to systems, methods and computer-accessible medium which can utilize a fingerprinting mechanism and/or procedure that can measure microscopic textures—e.g., when partially coherent light falls onto an object, the scattered light when projected to a screen can produce bright and dark regions, which can represent a pattern that is dependent on the structure of the underlying medium. As such, according to certain exemplary embodiments of the present disclosure, it is possible to uniquely identify, e.g., every texture based on its physical characteristics.

Exemplary embodiments of the present disclosure can include exemplary methods, procedures, computer-accessible mediums and systems according to the present disclosure which include receiving at least one first microscopic image of at least one portion of the physical object; receiving at least one second microscopic image of the at least one portion of the physical object; and comparing the at least one first microscopic image with the at least one second microscopic image to determine if a similarity measure, that is based on at least one descriptor, is within a predetermined range or threshold.

In certain exemplary embodiments, the physical object can be a type of at least one of fabric, plastic, paper, canvas, glass, metal, metal composite or alloy. In certain exemplary embodiments, the physical object has a particular surface roughness or light scattering properties. In certain exemplary embodiments, the physical object has a contour or curvature. In certain exemplary embodiments, the processing arrangement is part of either a handheld computing device or a cellphone, attached to a microscope arrangement. In certain exemplary embodiments, the at least one first microscopic image includes a texture speckle pattern or is a part of a video of a region of the physical object.

Certain exemplary embodiments can further include using an object invariant GaborPCA procedure, converting the at least one first microscopic image into a first low dimensional representation and the at least one second microscopic image into a second low dimensional representation; and determining the similarity measure by comparing if a particular metric distance between the first low dimensional representation and the second low dimensional representation is within a predetermined amount, wherein the predetermined amount is determined using a mathematical function.

Certain exemplary embodiments can further include using an object invariant, scale and rotation invariant gradient histogram feature detector, converting the at least one first microscopic image into first data and the at least one second microscopic image into second data; and determining the similarity measure by determining if a certain metric distance between the first data and the second data is within a predetermined amount, wherein the predetermined amount is determined using a mathematical function.

In certain exemplary embodiments, the at least one first microscopic image is extracted from a marked region, and wherein the marked region is a content of the physical object. In certain exemplary embodiments, the marked region corresponds to a user or an object identity. In certain exemplary embodiments, the at least one first microscopic image is extracted from a region near a landmark, and wherein the landmark is a content of the physical object. In certain exemplary embodiments, the at least one first microscopic image is extracted from a region with no mark. In certain exemplary embodiments, the at least one portion is selected based on a manual tracking or by an automated tracking in a reference coordinate system using the computing arrangement.

In certain exemplary embodiments, the computing arrangement is provided in a stationary device or a handheld device. In certain exemplary embodiments, the at least one first microscopic image is extracted when the computing arrangement is moved in a predefined region, and wherein the predefined region is computed based on a coordinate reference frame tracking system or a manual operation. In certain exemplary embodiments, the at least one first microscopic image is extracted in a non-invasive manner without touching a surface of the physical object. In certain exemplary embodiments, the computing arrangement has a specific configuration, wherein an angle and distance of an incident light source which cooperates with the computing arrangement is fixed based on a predetermined amount, wherein an angle and a distance of a capturing screen or a lens which cooperates with the incident light source in fixed based on a predetermined amount, and wherein the predetermined amount is based on a mathematical function.

In certain exemplary embodiments, the light source is one of visible, infra-red, ultra-violet or a combination thereof which provides a multispectral electromagnetic radiation. In certain exemplary embodiments, the incident light source arrangement cooperates with a polarizer. In certain exemplary embodiments, the incident light source arrangement is provided in a mobile phone attached to a microscope, and wherein the microscope is a handheld microscope or a handheld Universal Serial Bus microscope. In certain exemplary embodiments, the incident light source arrangement is provided in a microscope attached to a robotic arm or a computer numerical controller. In certain exemplary embodiments, the at least one first microscopic image is received from the physical object that is aged, tampered, crumpled or soaked.

Certain exemplary embodiments can further include generating a low dimensional representation from the at least one descriptor of the at least one first microscopic image, that can be printed, written, embedded or imprinted on the physical object; generating a low dimensional representation from the at least one descriptor of the at least one first microscopic image; and comparing the low dimensional representation with a low dimensional representation that is printed, written, embedded or imprinted on the physical object to check if the similarity is within a predetermined amount, thereby establishing an authentication of the physical object.

In certain exemplary embodiments, the physical object is authenticated as being an authentic source using either a secret key cryptography technique or a public key cryptography technique. In certain exemplary embodiments, the at least one first microscopic image, and the at least one descriptors are stored in an online repository. In certain exemplary embodiments, one or more microscopic images are extracted from a first curve along a surface of the physical object, and wherein a movement of the computing arrangement is provided along a second curve, and the second curve is similar to the first curve, and is predetermined using a mathematical function or a manual operation. In certain exemplary embodiments, the second curve is derived from a mathematical function or from a user specific motion or a signature.

Certain exemplary embodiments can further include using the computing arrangement, extracting a plurality of microscopic images, including the at least one first microscopic image, wherein the plurality of microscopic images are of a substantially entire region of a surface of the physical object. In certain exemplary embodiments, the at least one descriptor based on a computed set of the at least one descriptor of the at least one first microscopic image.

Certain exemplary embodiments can include performing an authentication and a verification of the physical object by: pointing the computing arrangement to a predetermined region and extracting a particular microscopic image; and processing one or more of the at least one first microscopic image to compute the at least one descriptor so as to compare stored descriptors with the computed at least one descriptor using a distance metric.

In certain exemplary embodiments, the at least one first microscopic image and the at least one second microscopic image each includes at least one of: a still image and a video. In certain exemplary embodiments, the at least one descriptor includes at least one of a local descriptor or a local descriptor.

These and other objects, features and advantages of the present disclosure will become apparent upon reading the following detailed description of embodiments of the present disclosure, when taken in conjunction with the appended claims.

BRIEF DESCRIPTION OF THE DRAWINGS

The foregoing and other exemplary objects of the present disclosure will be apparent upon consideration of the following detailed description, taken in conjunction with the accompanying exemplary drawings and claims, in which like reference characters refer to like parts throughout, and in which:

FIG. 1 is an illustration of a handheld microscope attached to a mobile phone, which can be used with certain exemplary embodiments of the present disclosure;

FIGS. 2(a) and 2(b) are illustrations of microscopic texture images, where the bottom part is marked using an indelible ink which acts as a reference mark, according to certain exemplary embodiments of the present disclosure;

FIG. 3(a) is an illustration of a match of exemplary microscopic texture images, whereas darker lines represent matching descriptors;

FIG. 3(b) is an illustration of a no-match of the microscopic textures, as about 80% of the slope differences may not be less than ±;

FIG. 7 is an illustration of an exemplary table of Fractional Hamming Distance of a linen speckle;

FIG. 8 is an illustration of an exemplary table of Fractional Hamming Distance of a linen speckle with its own different instances across various levels;

FIG. 9(a) is an illustration of a speckle image taken on the cellphone;

FIG. 9(b) is an illustration of a QR code of the compact code which is shown on the right side;

FIGS. 10(a)-10(t) are illustrations of speckles captured using an exemplary embodiment of a system according to the present disclosure;

FIG. 11(a)-11(l) are illustrations of graphs of exemplary Fractional Hamming Distances of different materials;

FIG. 13 is an illustration of an exemplary articulated arm with two degree of motion: vertical (x,y) and horizontal (x,z) in accordance with certain exemplary embodiment of the present disclosure, with a rotary head provided with the microscope fitted is seen at a left portion thereof;

FIG. 14 is a flow diagram according to an exemplary embodiment of a method of the present disclosure;

FIG. 15 is a block diagram of an exemplary embodiment of a system according to the present disclosure;

FIG. 16 is an illustration of a field of view of an exemplary Veho Digital Microscope at 400×; zoomed in on optical micrometer stage of 100 divisions, where the distance between each division is 10 microns and size of each division mark is 3 microns;

FIG. 17 is an illustration of an exemplary view of the Veho digital microscope used in certain experiments using the exemplary embodiments of the system, method and computer-accessible medium of the present disclosure;

Figure 4A:
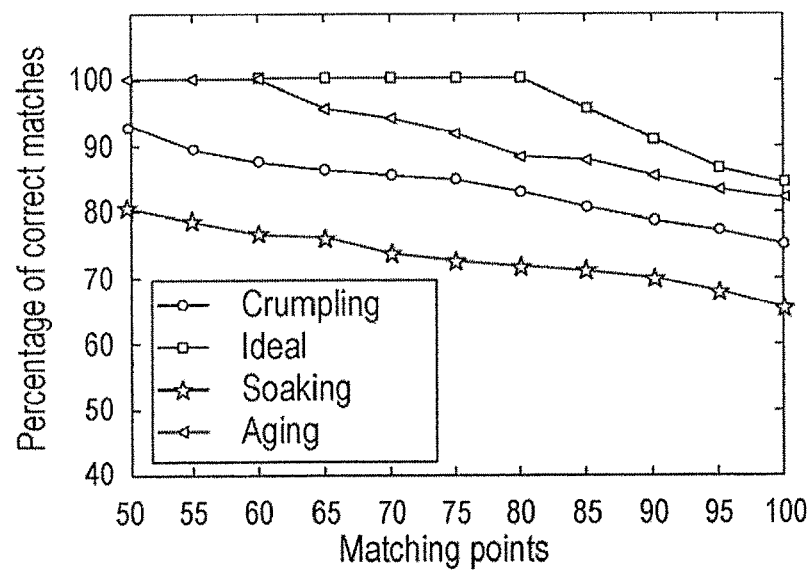
FIG. 4(a) is a graph illustration of an evaluation of a local descriptor procedure across large number of microscopic textures of a canvas, whereas an x-axis provides number of matching points or descriptors and a y-axis provides a percentage of correct matches.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments and appended claims. It is intended that changes and modifications can be made to the described embodiments without departing from the true scope and spirit of the subject disclosure.

DETAILED DESCRIPTION OF THE DISCLOSURE

Exemplary embodiments of the methodologies and procedures which can be implemented by the exemplary embodiments of systems, methods and computer-accessible mediums according to the present disclosure will now be described, at least to some extent, with reference to the figures.

Exemplary Microscopic Textures

An exemplary microscopic texture image captured can be a function of the underlying physical characteristics of the medium and the light scattering through the medium. Light scattering can be complex at the microscopic level since it depends on various factors such as the density of the media (e.g., optical density), homogeneity (e.g., isotropic or anisotropic scattering), surface roughness, irradiation and illumination direction (e.g., direction of incident light).

Exemplary microscopic textures can be different from ordinary macroscopic images or photos due to a variety of factors, such as:

i) complex multiple scattering in the medium produces artifacts not present in the media speckles, shadows and/or interreflections;

ii) images can vary based on the reflective or diffuse nature of the medium; and iii) repeatedly obtaining or registering the same texture can be difficult due to its microscopic size (e.g., around 1 to 2 microns).

CUReT database of textures can provide large sets of real world textures, but these can be at a macroscopic level and their properties (e.g., grey level histograms) can be dependent on the irradiation and illumination directions. Textures at a macroscopic level can be characterized in some form by BTF (Bidirectional Texture Function), which can provide a way to determine and compute and simulate textures given the irradiation and illumination directions. Inverse light transport can try to remove shadows, interreflections and other masks from an image, and reconstruct the mesostructure based on specular reflection. Exemplary embodiments of the present disclosure can analyze, identify and compare unique textures at a microscopic level where light can undergo multiple scattering and where the image can contain artifacts such as shadows, speckles or interreflections.

Extracting Exemplary Microscopic Textures

The exemplary texture pattern can be sensitive to illumination direction, so the light source can be required to be in the same position to obtain repeatable texture patterns across trials. To achieve this, Using certain exemplary embodiments of the present disclosure, it is possible to use a microscope, such as a consumer grade microscope, e.g., an exemplary Veho Discovery handheld microscope with a magnification of 400× which has in-built LEDs in fixed positions, e.g., as shown in FIG. 17. The light source can consist of 8 equally spaced LEDs fixed in circular fashion near the microscope lens. As the light hits the medium the light can undergo scattering and the scattered light can be read by the microscope. Since the texture image can depend on the angle and direction of the light source, calibration can be done before performing any trials or experiments. FIGS. 2(a)-2(b) illustrate an exemplary marker-based approach to extract the image in a fixed orientation. The ink seen on the bottom portion of the image can be used as a reference to extract the image. The field of view of the microscope at 400× can be around 0.95 millimeter, so Using certain exemplary embodiments of the present disclosure, it is possible to use objective micrometer stage for calibration, e.g., as shown in FIG. 16. The stage can include, e.g, 100 divisions in a range of about 1 millimeter, which can give the least count as about 0.01 mm or 10 microns. (For example, each division can be 10 microns). Given that the native image resolution of the microscope CMOS or this one exemplary embodiment is 640 pixels by 480 pixels, each pixel can correspond to around 1.4 microns. To give a sense of the scale, the size of the human red blood cell is around 6 to 8 microns. When operating at such resolutions, calibration can be important and Using certain exemplary embodiments of the present disclosure, it is possible to use the micrometer stage to focus the microscope to, e.g., 400× before performing any experiments.

To move the microscope to a specific location Using certain exemplary embodiments of the present disclosure, it is possible to use an articulated arm 131, e.g., as shown in FIG. 13. The articulated arm 131 can include the microscope 132 attached to its head. The articulated arm can be adjusted to predefined locations and can be placed near the medium to extract textures from various positions. The extraction positions can be predefined using a marker pen. These markers can be important since, according to certain exemplary embodiments, it is possible to operate at a microscopic level, minor shifts in position of the articulated arm can position the microscope at a different location. Therefore, based on certain Using certain exemplary embodiments of the present disclosure, it is possible to of the present disclosure, it is possible to utilize a marker based approach to obtain a correct position. The ink seen on the bottom portion of the image can be used as a reference to extract the image. Once the position is fixed, the microscope can be kept at, e.g., 400× and the image can be extracted. The articulated arm 131 can allow exemplary embodiments to extract images not only from flat/horizontal surfaces, but also 3D (three dimensional) surfaces, such as sculptures, ceramics, antiques etc., due at least in part to its rotary head.

Figure 18:
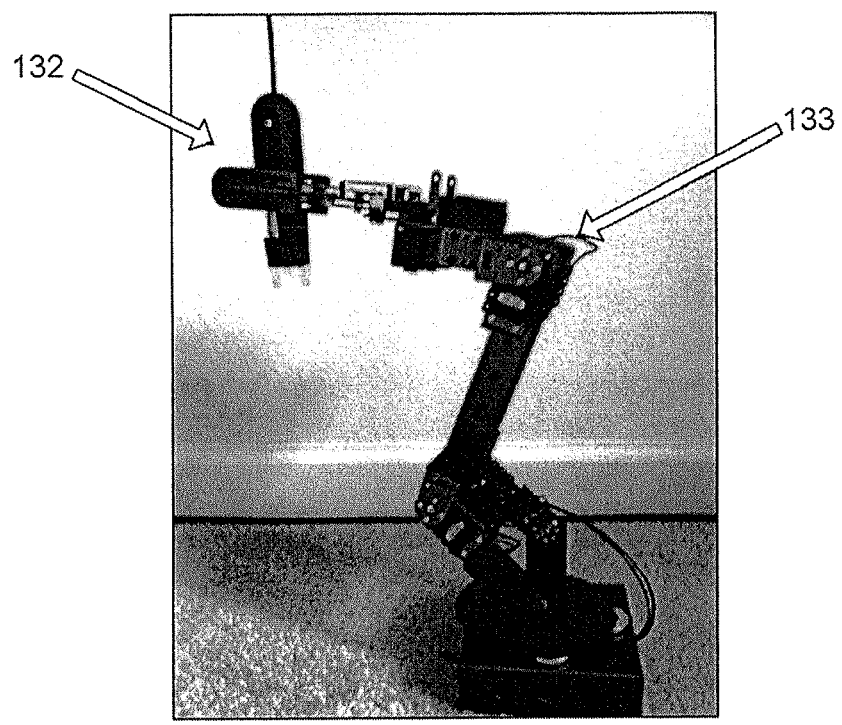
FIG. 18 is an illustration of an exemplary 4 degrees of freedom robotic arm fitted with a microscope which can be used the exemplary embodiments of the system, method and computer-accessible medium of the present disclosure.

In other exemplary embodiments, it is possible ton use, e.g., a 4 DoF robotic arm 133, e.g., as illustrated in FIG. 18, with the microscope 132 fitted to its rotary head to scan and read microscopic textures from various objects. The exemplary robotic arm can operate with or without a mark to read a region of surface and the coordinate system can be based on a fixed or relative reference frame technique that can be similar to a coordinate measuring machine.

Figure 19:
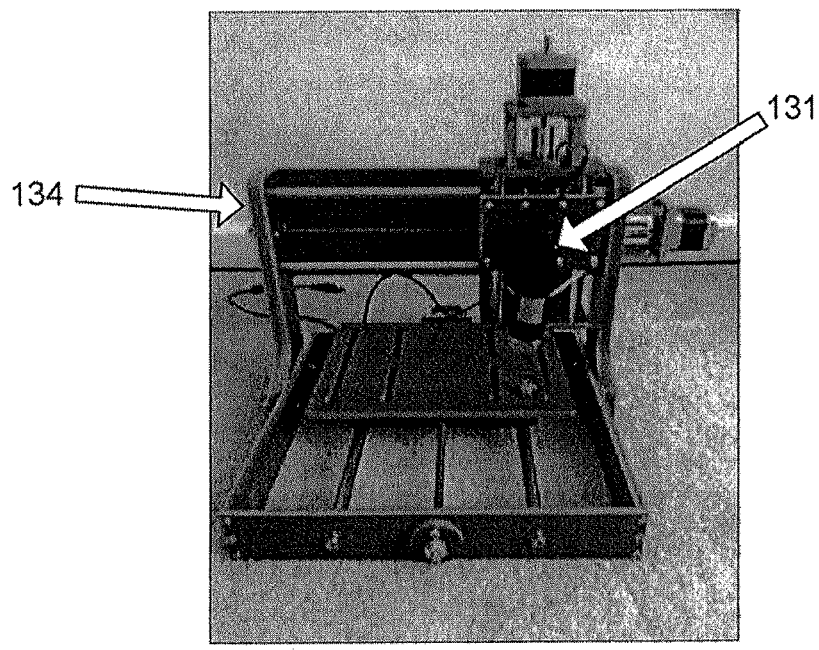
FIG. 19 is an illustration of an exemplary raster scan machine mounted with a microscope to its head which can be used the exemplary embodiments of the system, method and computer-accessible medium of the present disclosure.

According to certain exemplary embodiments, it is possible to utilize a raster scan machine 134, as shown in FIG. 19, to linearly read the microscopic texture on the surface of an object to, e.g., identify texture speckle patterns. The exemplary microscope 131 fitted onto the head of the raster machine 134, such as a CNC router or carving machine as shown in FIG. 19, can be used to read microscopic images of the surface of a material. Similar to the robotic arm 133, Using certain exemplary embodiments of the present disclosure, it is possible to be implemented with or without the need of any mark to scan a desired a region, since the repeatability and precision of the CNC machine can precisely position itself in a predetermined region of the surface.

In another exemplary embodiment of the present disclosure, it is possible to include mobile devices and mobile device attachments for extracting microscopic textures in a mobile manner. For example, according to one exemplary embodiment, it is possible to include a cellphone attachment to a microscope, e.g., a PC-Micro microscope with a lower magnification of 100×. The microscope can attach itself to a custom built plastic frame, which can be attached to the back of the cellphone camera such that the microscope eyepiece is aligned to the cellphone camera, e.g., as shown in FIG. 1. The process of texture image extraction can be the same as the articulated arm version, but the extraction of images can require more time than the articulated arm approach, since moving and focusing into a specific location can take longer without a fixed apparatus (such as an articulated arm).

According to further exemplary embodiments of the present disclosure, it is possible to use any number of illumination techniques. For example, Using certain exemplary embodiments of the present disclosure, it is possible to it is possible to extract textures based on forward illumination, or illumination where the source (e.g., light source) and lens were in the same plane. It is also possible to evaluate textures from other materials, e.g., paper, based on transillumination, e.g., when light passes through the structure and the (light) source and lens are in different planes. According to Using certain exemplary embodiments of the present disclosure, it is possible to, it is possible to extract textures from various exemplary materials in, e.g., the following way. For canvas, paper, plastic, metal and different types of cloth, Using certain exemplary embodiments of the present disclosure, it is possible to use a marker to zoom in and focus on a particular point. For glass, it is possible to use the manufacturer's logo, since the logo can be etched, it can act both as a marker and a place for texture extraction. Alternatively, the exemplary embodiments described herein can be used for the other exemplary material, or other methods can be used in conjunction with the exemplary embodiments of the present disclosure for uniquely identifying exemplary materials.

Exemplary Local Descriptor and Matching

A local descriptor procedure according to an exemplary embodiment of the present disclosure can be a fixed scale, fixed orientation version of the scale invariant feature transform procedure. The microscopic texture image can be smoothed using, e.g., a Gaussian blur function, with a blur factor $\sigma$=across 5 successive images. Difference of Gaussian (DoG) can be performed between these images and Using certain exemplary embodiments of the present disclosure, it is possible to then obtain 4 DoG images. There is no need to compute scale-space representation of the texture, since in certain exemplary embodiments, it is possible to extract the texture each time using the same microscope configuration (e.g., resolution, magnification etc.) Once we obtain the DoG images, keypoints can be detected by finding the maxima/minima (e.g., by comparing the 8 neighbors of each of the pixels across 4 DoG images).

The initial keypoints can be identified, and low contrast keypoints and poorly localized keypoints can be removed. Once the robust set of keypoints are identified, histograms of gradient orientation around the neighborhood of the keypoint can be determined. Unlike SIFT (Scale-invariant feature transform), which can compute the dominant orientation, in certain exemplary embodiments, it is possible to skip this step and can directly compute the histogram of orientation gradients around the keypoint. The rationale for this exemplary approach includes the following. During the initial registration of the texture, a specific orientation for extracting the texture can be determined (e.g., based on the marker). Once the orientation is fixed for a particular texture, the information can be used for subsequent trials. So, there can be no need to compute the dominant orientation for a keypoint. The histograms of gradients can be computed for a 16 by 16 (16×16) region around the keypoint, each histogram can consist of 8 bins and the 128 histogram values is the descriptor vector.

Exemplary Matching of Images

Given two microscopic texture images, the overall matching process to determine whether the two microscopic textures correspond to the same surface can involve certain steps.

Matching Descriptors: With certain exemplary embodiments, it is possible to determine and/or compute the list of descriptors for each image and exhaustively compare the descriptors of two images to determine matching descriptors. For example, two descriptors can be defined as a match if the Euclidean distances between the descriptors are within a threshold t. Let $D_1 = d_1, d_2, \ldots, d_n$ be the set of descriptors of one image and $D_2 = \delta_1, \delta_2, \ldots, \delta_n$ be the set of descriptors of another image (e.g., assuming each image has the same number of descriptors). To match $D_1$ and $D_2$, the Euclidean distance between each pair of descriptors $d_i$, $\delta_j$ can be determined and the descriptors can then be matched if the Euclidean distance among pairs is less than a fixed threshold t.

Slope Matching:

Using certain exemplary embodiments of the present disclosure, it is possible to compute the slope of two corresponding matching descriptors and the slope difference among each pair of matching descriptors. If, e.g., 80% of the slope difference is within a threshold p, then the texture image can be considered a match, else it can be defined as not being a match. Let $K=(k_1, k_2, \ldots, k_n)$ be the set of all slopes of the n matching descriptors, where each $k_i$ is the slope of two matching descriptors. With certain exemplary embodiments of the present disclosure, it is possible to compute the difference across all slopes, $\text{Diff}=(k_1-k_2), (k_1-k_3), \ldots, (k_{n-1}-k_n)$ and check if the minimum percentage (e.g., 80%) of $\text{Diff} \leq \pm p$, where p is the threshold. If yes, then the according to certain exemplary embodiments of the present disclosure, it is possible to consider the image to be a match, else it can be considered to not be a match. Referencing the example illustrated in FIG. 3(a), the lines can correspond to the pair of matching descriptors. 80% of the slope of these exemplary lines are within ±p, hence they are a match. In FIG. 3(b), less than 80% of the slope differences lie within ±p; hence they are not a match.

In certain exemplary embodiments, the matching of textures based on slope detection can operate because, i) in certain exemplary embodiments, it is possible to know a priori the settings of the hardware device (e.g., microscope, articulated arm), which can allow the certain exemplary embodiments to determine the type of transformation that might have occurred, ii) the certain exemplary embodiments obtain the initial image as a reference, while extracting the current image. Due to this exemplary information, with these exemplary embodiments of the present disclosure, it is possible to make adjustments to the device to register the image in the correct position and orientation. The nearest neighbor correspondence between descriptors combined with slope detection based on the location of the descriptors can result in a robust way to match two microscopic textures. This technique can also help in non-ideal conditions, e.g., when the medium undergoes tampering.

Exemplary Evaluation

Certain Using certain exemplary embodiments of the present disclosure, it is possible to evaluate, e.g., 2500 different types of microscopic textures from materials ranging from canvas, paper, and cloth to glass, plastic, wood and metal. Canvas, paper and cloth can be evaluated under four exemplary conditions: ideal, soaking, crumpling, aging. Glass, plastic, wood and metal can be evaluated under four exemplary conditions: ideal, soaking, scratching, aging. With certain exemplary embodiments of the present disclosure, it is possible to examine 50 different types of canvas. For each canvas, certain exemplary embodiments of the present disclosure, it is possible to extract 15 textures which can sum up to 750 texture images. For paper, the with certain exemplary embodiments of the present disclosure, it is possible to examine, e.g., 4 types of paper and take, e.g., 200 textures from each which sums up to 800 texture images. Using certain exemplary embodiments of the present disclosure, it is possible to examine 15 different cloth materials and extract 450 texture images. According to certain exemplary embodiments of the present disclosure, it is possible to examine 3 types of metal and extract 50 images from each type adding up to 150 images. Similarly, in certain exemplary embodiments of the present disclosure, it is possible to examine three types of plastic materials and extract 150 images. Using certain exemplary embodiments of the present disclosure, it is possible to examine two types of glass materials (e.g., 5 of each type) and extract 100 images from them. Finally, according to certain exemplary embodiments of the present disclosure, it is possible to examine seven types of wood and extract 100 microscopic textures from them. In each of the above outlined exemplary examinations, with certain exemplary embodiments of the present disclosure, it is possible to extract two images (e.g., of the same surface). The total of these exemplary examinations adds up to 2500 different microscopic textures with two images in each trial. The results are shown in FIGS. 4(a)-4(f).

The exemplary matching criterion can be based on the slope matching technique, e.g., as described above. A keypoint can be considered a match if its Euclidean distance with another keypoint is the at least t among the set of all keypoints. With the above described exemplary embodiments of the present disclosure, it is possible to use t=0.8 in the exemplary evaluation. An image can be considered a match (e.g., correct match) if the minimum percentage (e.g., 80%) of the slope difference of the matched keypoints is within p. Here we take p=±0.2. For evaluation, each texture image can be compared with every other texture image in the dataset. The slope detection matching can be performed across a range from 50 to 100 matching keypoints. Then, the correct match percentage across the entire dataset can be tabulated and plotted with the corresponding matching keypoints value.

To simulate non-ideal conditions such as crumpling, soaking, scratching and aging, using certain exemplary embodiments of the present disclosure, it is possible to conduct the following experiment with the materials. For paper, the region near the texture can be smudged, which can change the microscopic texture pattern, e.g., by about 10%. For plastic cards, real-world conditions can be applied, e.g., by touching the microscopic texture region multiple times. The change in the exemplary microscopic texture pattern can be about 5-8%. For canvas and fabric, how fabric is handled in real-world settings can be simulated, e.g., stretch the region where the texture was extracted from, fold it etc. This changes the original texture, e.g., by about 10-12%. For glass surfaces, water can be poured on it, and the region can be cleaned and the microscopic texture pattern from the manufacturer's logo can be extracted. The texture pattern can change, e.g., by about 5%. For wooden surfaces, the region near the microscopic texture pattern can be smudged. The changes to the microscopic texture pattern can be about 10%. For metals and alloys, the materials can be handled as in real-world settings and then extract the textures. The changes to the texture can be, e.g., about 5-10%. In one exemplary embodiment, an additional 100 texture images can be from two different microscopes and 500 textures using the mobile phone assembly.

Certain Using certain exemplary embodiments of the present disclosure, it is possible to consider 50 different types of cotton and linen canvases that are plain weaved, medium textured and fine textured. 9 types of canvas from, ArtFix™, 13 types of canvas from Claessens™ and 28 types of canvas from Carvaggio™. These exemplary canvases can be primarily used by artists for oil, acrylic and other emulsified types of paintings. For each type of canvas we extract 15 images which adds up to 750 texture images. For soaking, the matching percentage can deteriorate for matching keypoints above, e.g., 50. This can be due to the fibrous nature of the canvas; after soaking, some of the fibers can shift from their original positions. For crumpling, the matching percentage can decrease linearly, but the severity can be less, e.g., as compared to soaking. It can be difficult to crumple the canvas at a microscopic level. After crumpling an exemplary canvas it can stretch/go back to its earlier form. For aging, the decrease in matching percentage can be close to ideal. The results from these exemplary experiments and exemplary embodiments are shown in FIG. 4(a).

Figure 4B:
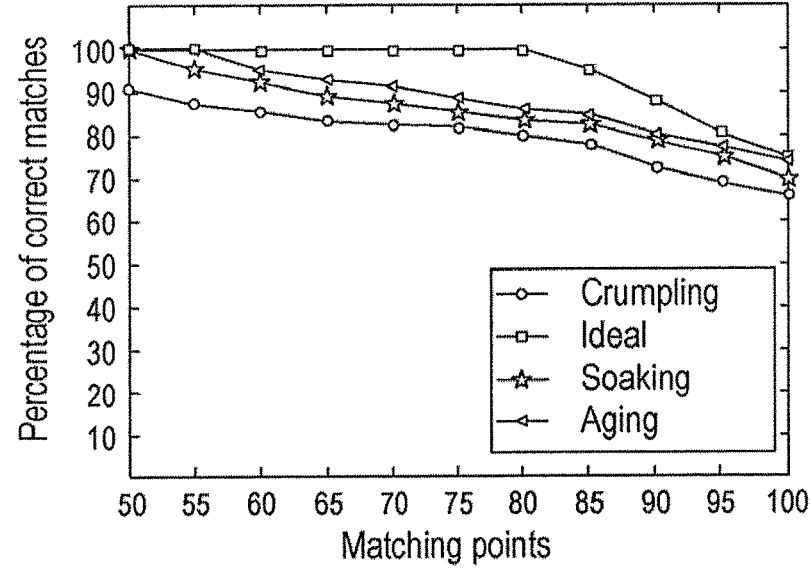
FIG. 4(b) is a graph illustration of an evaluation of the local descriptor procedure across a large number of microscopic textures of paper.

Exemplary embodiments of the present disclosure consider four categories of paper in the exemplary analysis: (a) A4 size print paper; (b) thin notebook style paper (ruled notebooks); (c) Thick print poster-style paper; (d) brown-colored binding paper. Using certain exemplary embodiments of the present disclosure, it is possible to evaluate, e.g., 800 pieces of paper of these categories. Under ideal conditions, the matching percentage can be 100 to 80 keypoints and then it can slightly decrease. Under soaking, crumpling and aging there can be little variation in results. When an exemplary paper region is crumpled, if the region damages the paper surface where the reading was taken from, then the reading in the next trial can fail. Therefore, under crumpling, the exemplary matching percentage results can be lower. In certain exemplary embodiments, soaking did not change the structure of the paper region, but illumination changes were observed. For exemplary aging tests, the exemplary paper was kept in natural sunlight for about a month, and variation in the paper structure was not observed. The exemplary results are shown in FIG. 4(b).

Figure 4C:
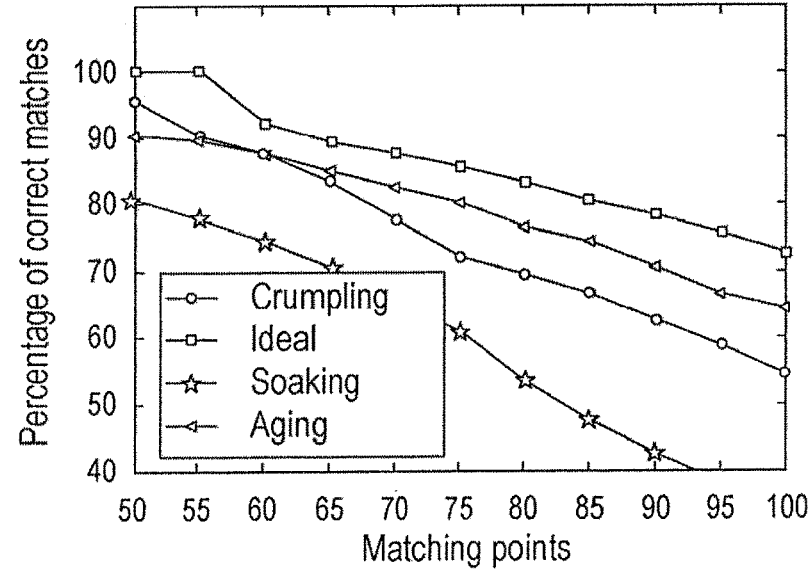
FIG. 4(c) is a graph illustration of an evaluation of the local descriptor procedure across a large number of microscopic textures of cloth.

Exemplary embodiments and exemplary evaluations can include different types of fabric such as wool, nylon, polyester, denim, cotton, terrycloth, acrylic and various mixtures such as, e.g., about 49% nylon 51% metallic, 87% Nylon and 13% spandex, 35% wool and 65% rayon. Under ideal conditions, with certain exemplary embodiments of the present disclosure, it is possible to obtain, e.g., close to or even 100% results for 50 keypoints, although after that, the exemplary results can drop quickly below 80% for 100 keypoints. Cloth type materials can suffer the most under soaking, which can be typical of fiber-based materials. For 50 keypoints the matching percentage can be 80 but it closes at, e.g., less than 40 for 100 keypoints. Under crumpling the percentage match can be around 90 and can finish below 50 for 100 keypoints. Under exemplary aging, the variation can be minimal. The matching percentage can be around 95 for 50 keypoints and can drop to below 70 for 100 keypoints. The exemplary results are shown in FIG. 4(c).

Figure 4D:
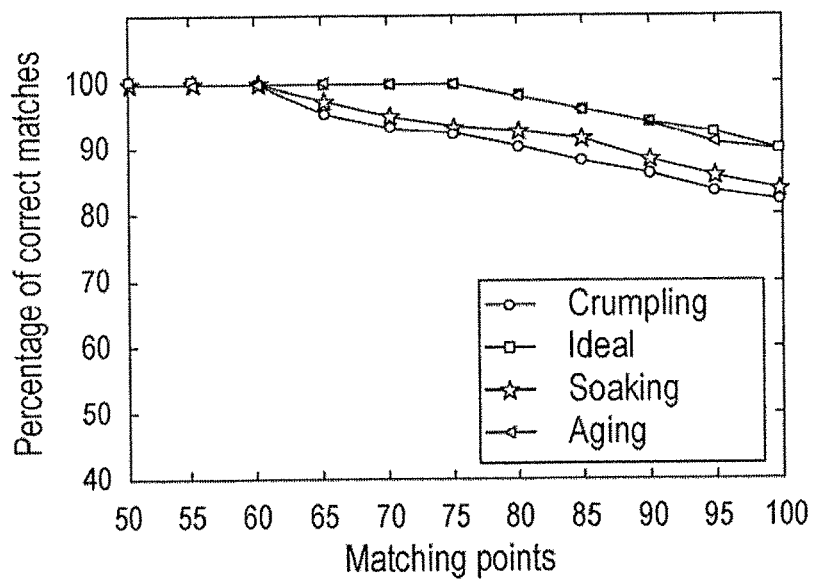
FIG. 4(d) is a graph illustration of an evaluation of the local descriptor procedure across a large number of microscopic textures of glass.

Exemplary embodiments and exemplary evaluations can include two types of, e.g., consumer grade glass materials. Both can be glass cups with manufacturer's logos etched in the glasses. Exemplary evaluations can include 5 glasses of each type (e.g., total 10) and can extract 10 readings from each glass summing up to 100 texture images. These logos can serve as reference points to extract texture pattern from a particular region. For 50 keypoints the matching percentage can be 100 and then can drop to around 90 for 100 keypoints. Under soaking and scratching cases, the matching percentage can start at 100 and drop around 85 for 100 keypoints. The exemplary results are shown in FIG. 4(d).

Figure 4E:
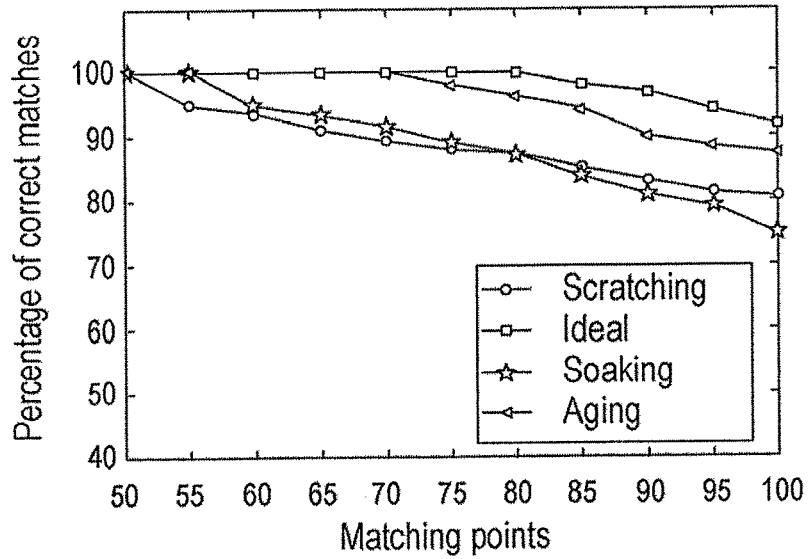
FIG. 4(e) is a graph illustration of an evaluation of the local descriptor procedure across a large number of microscopic textures of metal.

Exemplary embodiments and exemplary evaluations can include three types of metals: brush-metal, steel and aluminum composite. Exemplary evaluations can extract, e.g., 150 microscopic textures from them. Under exemplary ideal and aging cases, there can be little variation. For 50 to 70 keypoints in both cases, the matching percentage can be 100 and then it can drop to around 90 for 100 keypoints. Under soaking and scratching, the percentage matching for 50 keypoints can be around 100 and then it can reduce to around 75-80 for 100 keypoints. The exemplary results are shown in FIG. 4(e).

Figure 4F:
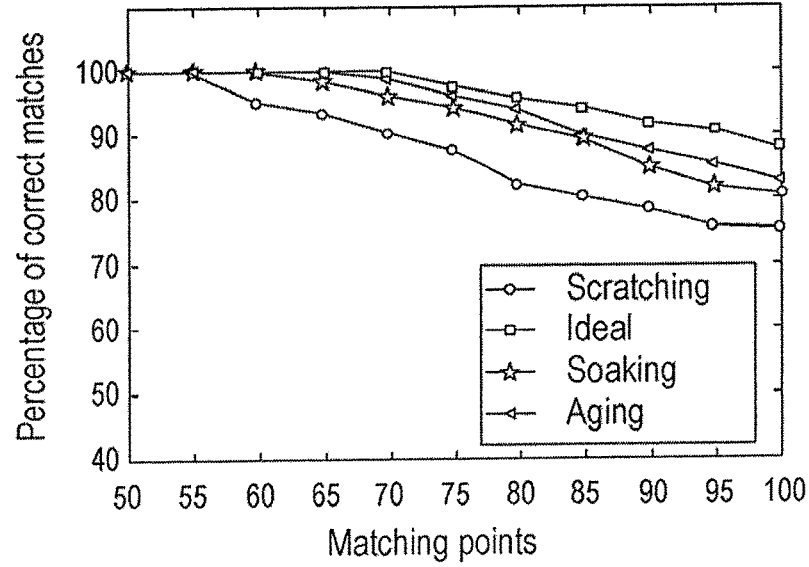
FIG. 4(f) is a graph illustration of an evaluation of the local descriptor procedure across a large number of microscopic textures of plastic.

Exemplary embodiments and exemplary evaluations can include, e.g., three types of plastic cards: two PVC cards and one fine grained surface of a plastic casing. Using certain exemplary embodiments of the present disclosure, it is possible to extract, e.g., 150 texture images from them. The exemplary surface roughness of the plastic cards can scatter light in a consistent manner across trials and under non-ideal conditions. There can be little variation among the ideal, soaking and aging conditions. Under exemplary scratching, the matching percentage can start at 100 for 50 keypoints but can reduce around 75 for 100 keypoints. The exemplary results are shown in FIG. 4(f).

Exemplary embodiments and exemplary evaluations can also include, e.g., seven different types of wood such as maple, oak, cedar, pine, mahogany, teak and fir, extracting 100 texture images. The values under ideal, aging and scratching are similar. Under soaking, we see that the drop is severe. The matching percentage for 50 keypoints is around 80 and then drops to around 60 for 100 keypoints.

Exemplary Entropy Analyzing

Quantifying the entropy of microscopic textures can be a complex problem, especially since with certain exemplary embodiments of the present disclosure, it is possible to have a limited data set in comparison to the size of the N-dimensional space over which each microscopic texture can be represented.

Using certain exemplary embodiments of the present disclosure, it is possible to include an exemplary analysis strategy can include the following. with certain exemplary embodiments of the present disclosure, it is possible to consider each keypoint descriptor which can represent a 128-dimensional vector and compute a lower bound on the entropy of each keypoint. Next, keypoints extracted from a microscopic texture can be sufficiently spaced out at a microscopic image level that according to certain exemplary embodiments of the present disclosure, it is possible to treat each keypoint descriptor as independent. Each keypoint can also be associated with a specific location in the microscopic texture such that even if two exemplary keypoints across two different microscopic texture images (e.g., of different surfaces) match, their locations may not match. Hence, using certain exemplary embodiments of the present disclosure, it is possible to compute the entropy of a texture by summing up the individual entropy of the keypoints.

There can be three exemplary aspects which can make this exemplary computation of the entropy of a keypoint challenging. First, multiple readings of the same microscopic texture may yield slightly varied 128-dimensional vectors which can need to be taken into consideration in the entropy calculation. Second, with certain exemplary embodiments of the present disclosure, it is possible to lack sufficient datapoints in, e.g., a 128-dimensional space to characterize entropy of a keypoint. Additionally, within the exemplary 128-dimensional space, exemplary embodiments may not have a clear understanding of the correlation across the dimensions.

To address the first problem, with certain exemplary embodiments of the present disclosure, it is possible to use a quantization step/procedure, where each 128-dimensional keypoint can be converted to a quantized 128-dimensional vector where multiple microscopic texture readings of the same surface can map to the same vector. To address the second problem, using certain exemplary embodiments of the present disclosure, it is possible to sub-divide each keypoint into 16 8-dimensional vectors (e.g., corresponding to a 4×4 square representation) where each 8-dimensional vector can correspond to a smaller region within the texture reading. To address the third problem, according to certain exemplary embodiments of the present disclosure, it is possible to restrict themselves to the four corners of a keypoint and compute the joint entropy of the four corners to show that the 8-dimensional vectors corresponding to the four corners have the least correlation between them. This exemplary procedure can include a number of individual exemplary steps/sub-procedures, which include the below discussed exemplary steps/sub-procedures.

Exemplary Quantization

For example, multiple texture readings of the same surface can slightly vary. An exemplary matching procedure can use a Euclidean distance of t to determine if two keypoints match. A rigid version of this matching algorithm can be to set a bound of $$\frac{t}{\sqrt{128}}$$

for each dimension. In addition, since the 128 dimensional space can be too large for entropy computation, Using certain exemplary embodiments of the present disclosure, it is possible to restrict ourselves to 8-dimensional vectors of each 4×4 area corresponding to a keypoint. For example, let $v_i$ be the 8 dimensional vector. Using certain exemplary embodiments of the present disclosure, it is possible to quantize the vector $$v_i, q_i = v_i \Big/ \frac{t}{\sqrt{128}}$$

and round the values to the nearest integer.

Exemplary Entropy of Quantized Vector

Once, in particular exemplary embodiments, the quantized vector $q_i$ is provided, it is possible to calculate the entropy of this quantized vector. The state space of this quantized vector can be, e.g., $s^8$, for an 8 dimensional vector, where s can be the maximum quantized value across all $q_i$. As part of the exemplary dataset, there can be around, e.g., 2500 images, each with at least 1000 keypoints which can sum up to 20 million 8-dimensional vectors. Using certain exemplary embodiments of the present disclosure, it is possible to compute the probability of the vector $q_i$ across this dataset and compute its entropy as follows: the probability of the 8-dimensional vector $q_i$ can be given by, $P_i(q_i)=F(q_i)/\Sigma F(q_1, q_2, \ldots, q_n)$ where $F(q_i)$ is the frequency of $q_i$ and $\Sigma F(q_1, q_2, \ldots, q_n)$ is the sum of frequencies of all $q_i$. Then the entropy of $q_i$ can be computed as follows, $$H_i = -\sum_{i=1}^{s^8} P_i \log_2(P_i).$$

Figure 5:
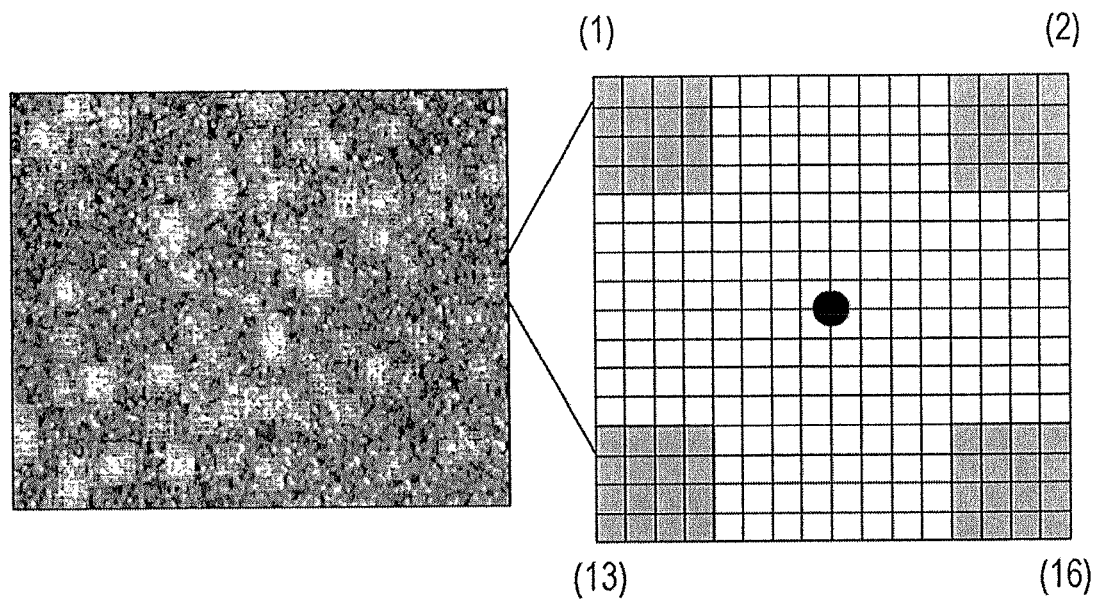
FIG. 5 is an illustration of a microscopic texture image, along with an exemplary 16×16 neighborhood being enlarged.

An exemplary local descriptor procedure can extract unique features from local regions. Such exemplary procedure can use a 16×16 neighborhood region around the keypoint to compute histogram gradients. Of these exemplary 16×16 regions, each 4×4 region can correspond to an 8-dimensional vector. While computing the gradient histogram, adjacent pixels can be used to compute the gradient and orientation. Due to this computation, adjacent 4×4 regions can be dependent on each other, which means the 8-dimensional vectors of adjacent regions can be highly correlated. Using certain exemplary embodiments of the present disclosure, it is possible to consider the 8-dimensional vectors corresponding to the four corner 4×4 regions, e.g., as illustrated in FIG. 5. FIG. 5 is an illustration of an exemplary microscopic texture image with local 16×16 neighborhood overlayed, along with an exemplary 16×16 neighborhood being enlarged to show four exemplary corner 4×4 regions whose 8-dimensional vectors can be used in an entropy calculation. These vectors should exhibit the least correlation between themselves. An exemplary corner 4×4 region can correspond to, e.g., a 6×6 micron region at the physical level with, e.g., a minimum separation of 11 microns between each of the four regions. These exemplary regions can be spatially separate at the micron level. Thus, by assuming the regions are not correlated at a physical level, the with certain exemplary embodiments of the present disclosure, it is possible to exhibit very low correlation at the corner 8-dimensional vectors. Therefore, according to certain exemplary embodiments of the present disclosure, it is possible to compute the entropy of these corner vectors and give a lower bound on the entropy of the entire keypoint. Some of the 16×16 regions can also be spatially separate from one another. These spatially separate 16×16 regions can be physically separate regions at a microscopic level. Also, the local descriptor algorithm can be a fixed scale, fixed orientation algorithm, so there can be no dependency between scales or dominant orientation. To compute the entropy of the image, with certain exemplary embodiments of the present disclosure, it is possible to add the entropy of the individual spatially separate keypoints.

Exemplary Entropy Calculation/Determination

To compute or otherwise determine a lower bound on the entropy of a single exemplary keypoint, according to certain exemplary embodiments of the present disclosure, it is possible to consider the four corner 8-dimensional vectors of the 4×4 regions. The exemplary dataset can comprise 2500 images, each with at least 1000 keypoints descriptors which sums up to 20 million 8-dimensional vectors. Using certain exemplary embodiments of the present disclosure, it is possible to obtain a quantized $7^8$ space from, $$q_i = \frac{v_i}{\frac{t}{\sqrt{128}}},$$

where t=0.8; this t can be the threshold for the nearest neighbor matching step in the algorithm.

For a quantized $7^8$ space, the results can include the following. The entropy of the first 4×4 8-dimensional vector (1) can be 8.73, fourth 4×4 8-dimensional vector (4) can be 8.83, (13) can be 8.73 and (16) can be 8.82. Next, according to certain exemplary embodiments of the present disclosure, it is possible to compute the joint entropy of the 16-dimensional vectors (1,4), (1,13), (1,16), (4,13), (4,16), (13,16) and check if their combined entropy can be the sum of individual entropy of each 8-dimensional vector. For a quantized $7^{16}$ space, the results can include the following. The entropy of (1,4) can be 15.7255, (1,3) can be 15.7163, (1,16) can be 15.7848, (4,13) can be 15.8004, (4,16) can be 15.3001, (13,16) can be 15.7216.

These exemplary results indicate that each of the four corner 8-dimensional vectors can have minimal correlation between them; e.g., the joint entropy can be almost equal to the sum of the individual entropies. While there can be sufficient datapoints to compute the entropy within a $7^8$ space, there may not be sufficient datapoints to compute the joint entropy accurately within the $7^{16}$ space. This shows that the 8-dimensional vectors across the four corners of a keypoint exhibit minimal correlation. Using certain exemplary embodiments of the present disclosure, it is possible to approximately estimate the entropy across the four corners of a keypoint to be at least 30 bits (e.g., comparable to the sum of the joint entropy of (1,4) and (13,16)). Hence, the minimum entropy that can be extracted from a single keypoint can be 30 bits. Assuming 50 spatially separate descriptors per image, with certain exemplary embodiments of the present disclosure, it is possible to compute the entropy of a microscopic texture image to be around 30×50=1500 bits. This can be an approximate computation of a lower bound of the entropy value to primarily illustrate that the entropy of microscopic textures can be significantly high to warrant them as a candidate choice for fingerprinting different physical surfaces.

Exemplary Applications:

The effectiveness of physical fingerprinting include the fact that any physical surface can be authenticated. Some of the exemplary applications can lie in the art industry, finance sector, luxury clothing industry, pharmaceutical industry and auto parts, to name a few exemplary applications.

Exemplary microscopic textures can be extracted from an exemplary canvas (e.g., back of a painting) at multiple locations and the descriptors which are the fingerprints of the canvas can be stored in the database. This fingerprint can be combined or linked with the artist's information, painting information and other exemplary transactional data to authenticate the artwork in the future.

Microscopic textures can be extracted from a bank check and the descriptors/fingerprints can be stored in a central server. The bank check can now be authenticated on demand when a user or customer presents it, e.g., to the teller in the bank. An exemplary user can use the exemplary portable cellphone microscope assembly to read the microscopic texture, compute the fingerprint and check if it matches the fingerprint on the check. If it does, then the check is not a duplicated or photocopied. This mechanism can be applied to any type of paper document. Similarly, currency notes can be fingerprinted. Given a pre-defined region, Using certain exemplary embodiments of the present disclosure, it is possible to extract the microscopic texture from that region and store it. A user with the exemplary fingerprinting application on the user's device or phone can verify the authenticity of the currency note by extracting the texture pattern, e.g., at the pre-defined region and compute the fingerprint. This fingerprint can be compared with the fingerprint in the database to check the authenticity of the currency note.

Counterfeit clothing can be another application with losses in billions of dollars worldwide. Microscopic textures can be extracted from the clothing material at specific locations (e.g., the manufacturer's logo) and then passed on to the retail shop. Anyone with a cellphone microscope assembly could authenticate that piece of fabric.

Counterfeit credit cards, debit cards, ID cards or any sort of plastic cards can now be authenticated via the exemplary embodiments described herein. The drug development (pharma) industry can also use exemplary embodiments to identify counterfeit drugs. Using certain exemplary embodiments of the present disclosure, it is possible to authenticate drug bottles, plastic containers and other materials which can be used in the field of pharma and medicine, thereby reducing counterfeiting. In many regions, there can be a large counterfeit market in the field of automobile spare parts. Exemplary embodiments of the present disclosure can be used to authenticate every spare auto part, and the authenticity of the part can be checked in the auto shop before you buy the spare part.

FIGS. 9(*a*) and 9(*b*) illustrate exemplary snapshots of the implementation of speckle image, its compact code, menu options and the corresponding 2D QR barcode representation of the compact code. The exemplary 2D QR code can be scanned using any standard barcode scanner application on a cellphone to reveal the compact code. This compact code can be compared for a match with the candidate compact code that is computed after reading the speckle pattern. Using certain exemplary embodiments of the present disclosure, it is possible to be used for: (a) generating barcode representation of new speckle images; (b) comparing a new speckle pattern with a database of speckle patterns; and/or (c) reading a new speckle pattern and a barcode separately and comparing to see if they both match.

By applying Gabor transform on speckles, and thresholding to zero the complex part of the Gabor transform, a binary image can be obtained. When comparing a pair of speckle patterns using Fractional Hamming Distance, if the FHD is near 0, then the speckles are similar, or if the FHD is near 0.5, then the speckles are dissimilar.

Applying Gabor transform to speckle images consists of incrementing the frequency (f) by a scale factor s at each level, where a level consists of different orientations (θ). For example, a level 5 orientation 6 image can be chosen in the Gabor filter bank, as the binary image for speckles in plastic. According to certain exemplary embodiments of the present disclosure, it is possible to perform repeated trials of the same region of the plastic, extract speckle, apply Gabor transform and chose level 5 orientation 6 image in the filter bank, because if FHD is performed on that binary image, with the binary image from a different trial, the value should be close to 0. If speckles are from the same region, then their FHD should be close to 0.

Due to the variation in the underlying structure of the materials, speckles can vary across materials. For example, extracting speckles from clothing and obtaining the right Gabor binary image may not be trivial. For example, minor fiber disruptions can occur during handling of fabrics, therefore each speckle extracted can consist not only of speckles, but blurred spurious fibers. One way to minimize the effect can be to use stock computer vision algorithms to remove blurred pixels. However, if computing the fingerprint on a cellphone, it can have limited processing power compared to a desktop. One way around such problem can be to vary the scale s per material and check if a particular level and orientation, the FHD of a pair of same speckles, is close to 0. By increasing the scale s, the minor variations and errors (e.g., spurious fibers) can be subsumed.

For example, in linen (e.g., FIG. 10(*f*)) the extracted speckles can have spurious fibers within it. To overcome such deficiency, with certain exemplary embodiments of the present disclosure, it is possible to increase the scale by a factor of 1, compute the Gabor image and compare it with the original Gabor image (e.g., level 5 orientation 6, without change in scale). FIG. 7 and FIG. 8 show exemplary effects of varying s on the FHD. As per exemplary evaluations, the Gabor scale may need to be varied for only a subset of materials, e.g., two materials: linen and denim.

For example, FIG. 7 shows of an exemplary table of Fractional Hamming Distance of a linen speckle with its own different instances across various levels, whereas each instance can be a new measurement of the same speckle pattern. Even at Level 5, the two instances may not be match, since the values are close to 0.5. FIG. 8 provides an illustration of an exemplary table of Fractional Hamming Distance of a linen speckle with its own different instances across various levels. Each instance can include, e.g., a new measurement of the same speckle pattern and the scale of Gabor transform can be varied (e.g., increased). At Level 5, the FHD's match, as they are close to 0, as illustrated.

Other exemplary speckles can are shown in FIG. 10(a)-10(t), which are exemplary illustrations of speckles captured using an exemplary system as follows: FIG. 10(a)—paper, FIG. 10(b)—translucent PVC plastic card, FIG. 10(c)—opaque PVC plastic card, FIG. 10(d)—cotton, FIG. 10(e)—polyester, FIG. 10(f)—linen, FIG. 10(g)—rayon, FIG. 10(h)—49% nylon 51% metallic, FIG. 10(i)—acrylic, FIG. 10(j)—87% nylon 13% spandex, 1 FIG. 0(k)—nylon, FIG. 10(l)—wool, FIG. 10(m)—35% wool 65% rayon, FIG. 10(n)—jute, FIG. 10(o)—denim, FIG. 10(p)—terrycloth, FIG. 10(q)—wood, FIG. 10(r)—glass of type 1, FIG. 10(s)—glass of type 2, and FIG. 10(t)—97.5% zinc 2.5% copper.

Exemplary Statistical Properties

Figure 11A:
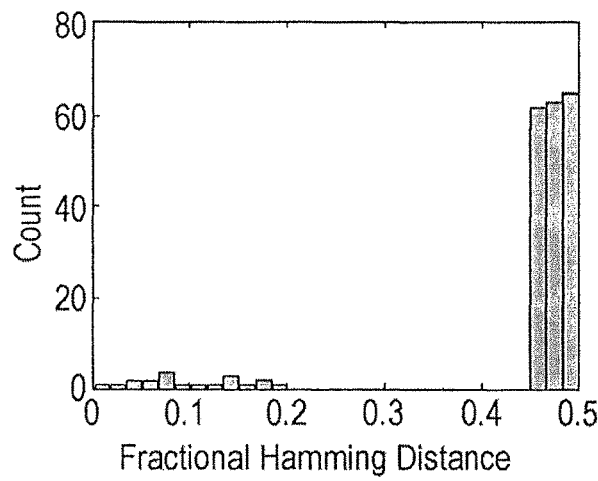
Figure 11B:
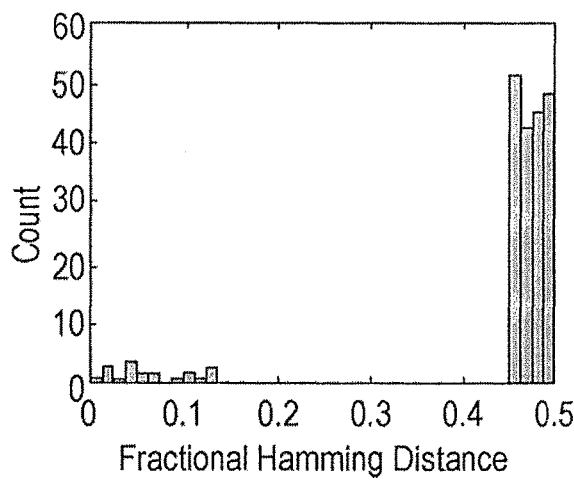
Figure 11C:
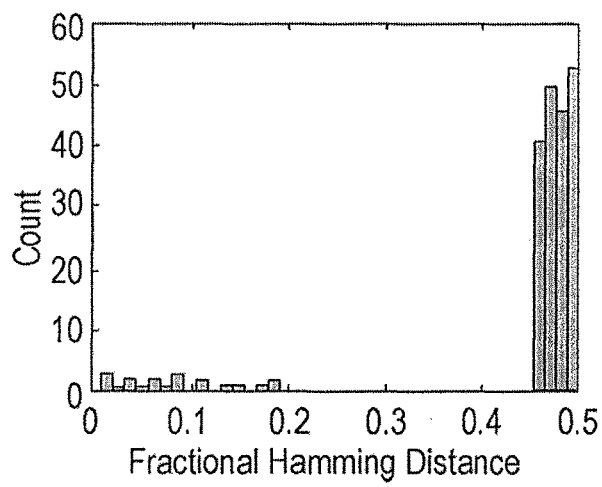
Figure 11D:
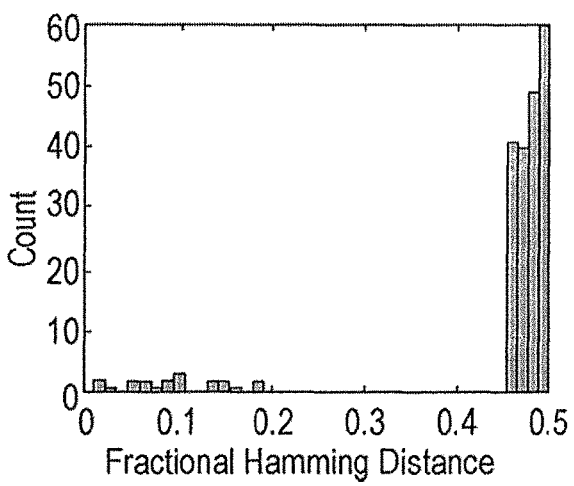
Figure 11E:
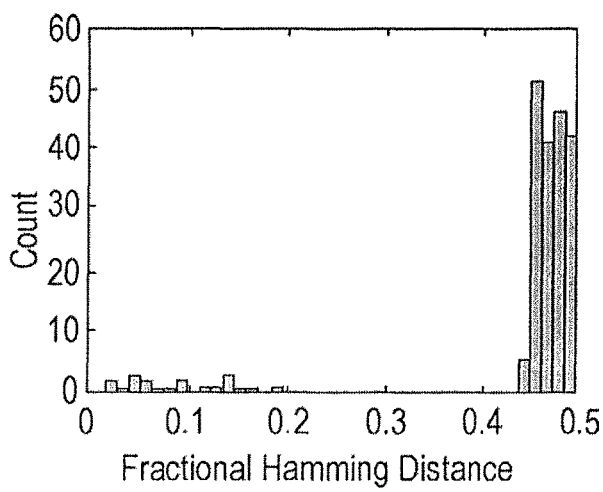
Figure 11F:
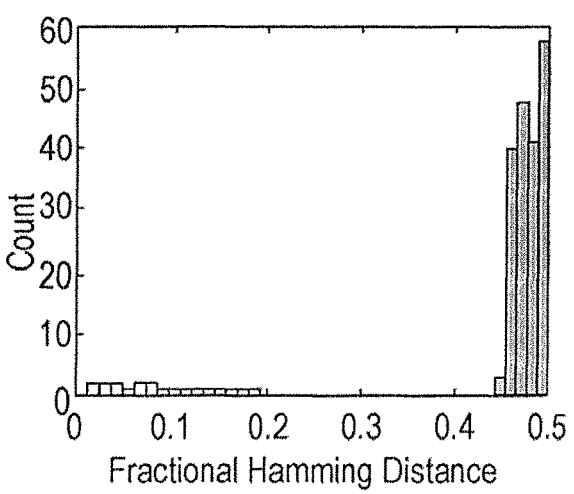

Uniqueness of speckles can be shown by presenting the histogram of Fractional Hamming Distance (FHD) of Gabor bits across 22 materials. FIG. 11(a)-11(i) show graphs in which FHD provide the respective distributions of Gabor bits of speckle patterns and shows that each pair that is compared is unique. For example, showing the uniqueness of speckles by comparing large number of speckles using Gabor transforms and statistically estimating their randomness. Empirical estimates of the entropy of speckles can be made by comparing the bitwise mean of large number of Gabor transformed speckles across materials, e.g., as shown in FIG. 11(j)-11(k). FIGS. 11(j)-11(k) illustrates the following exemplary graphs: FIG. 11(a)—FHD of translucent PVC plastic card; FIG. 11(b)—FHD of opaque PVC plastic card; FIG. 11(c)—FHD of woolen material; FIG. 11(d)—FHD of nylon material; FIG. 11(e)—FHD of polyester material; FIG. 11(f)—FHD of denim material; FIG. 11(g)—FHD of cotton material; FIG. 11(h)—FHD of terrycloth material; FIG. 11(i)—FHD of glass of type 1; FIG. 11(j)—Fractional Hamming Distance of 4950 different paper speckle bits and 100 same paper speckle bits; FIG. 11(k)—probability of a bit being set in a Gabor bit sequence of the 200 speckle images across materials; and FIG. 11(l)—Pairwise Euclidean distance of eigenvalues of Gabor transformed paper speckles.

Figure 12A:
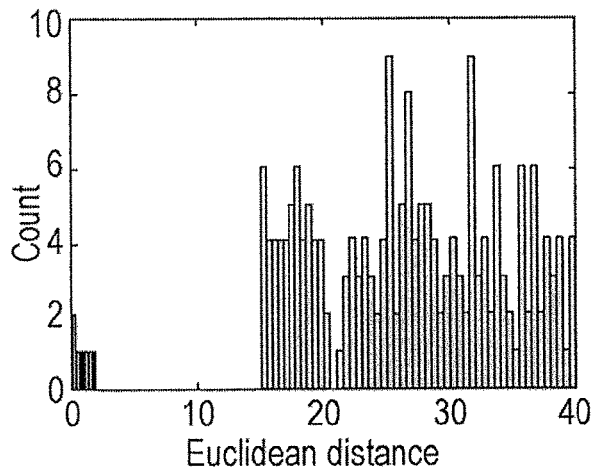
FIG. 12(a)-12(i) are illustrations of graphs of exemplary pairwise Euclidean distance between speckle images across materials.
Figure 12B:
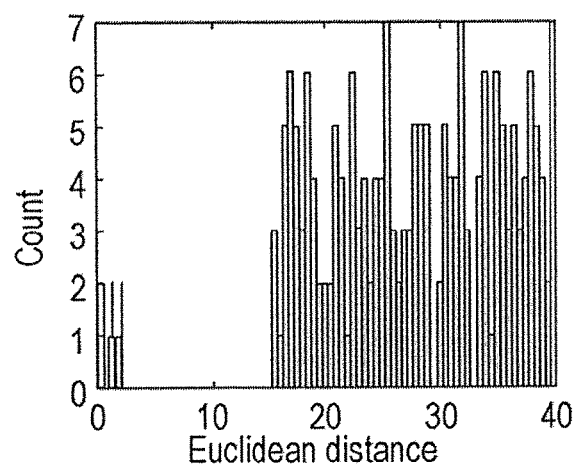
Figure 12C:
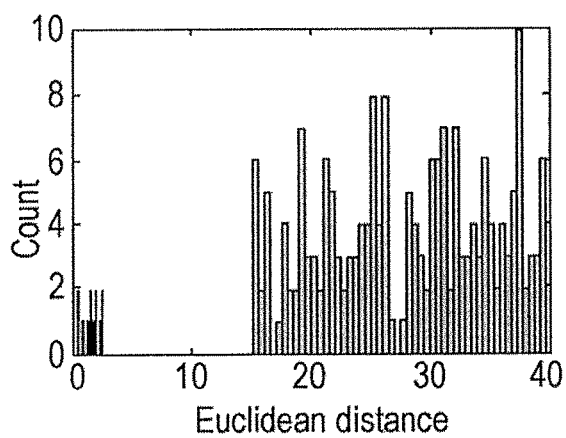
Figure 12D:
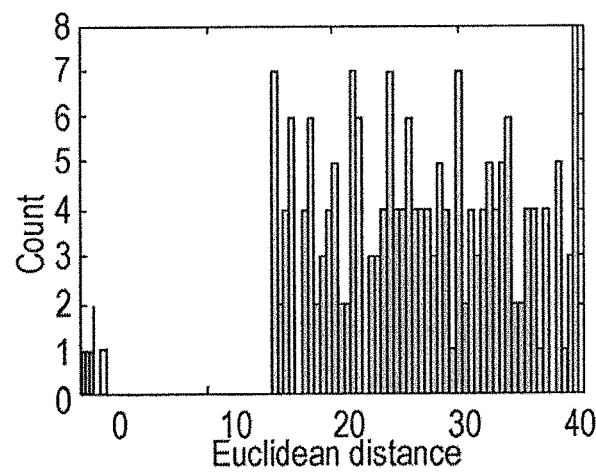
Figure 12E:
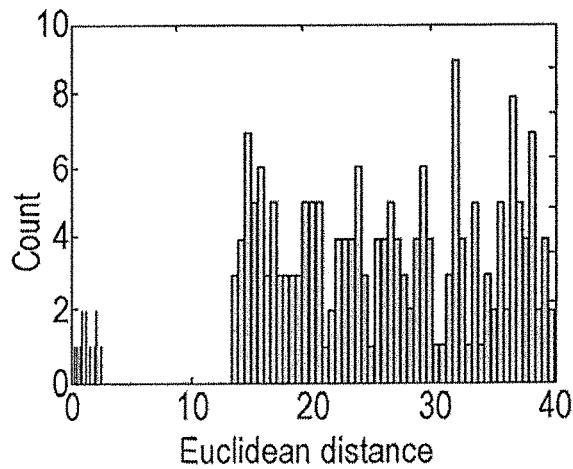
Figure 12F:
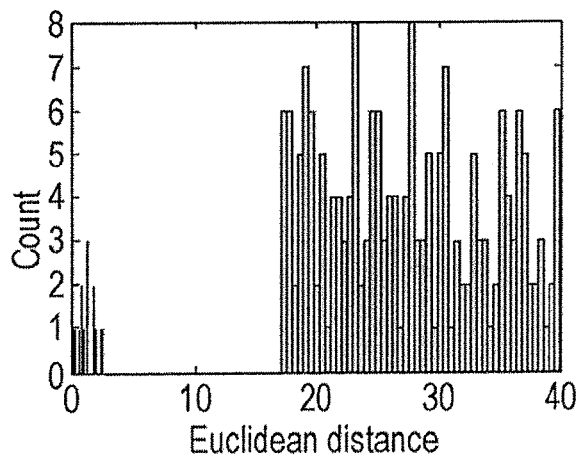
Figure 12G:
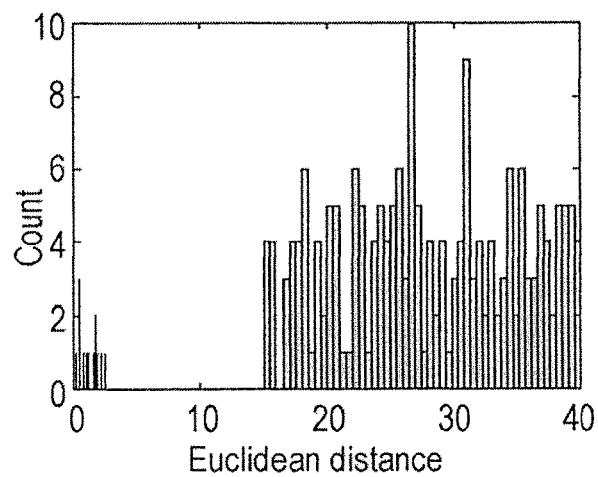
Figure 12H:
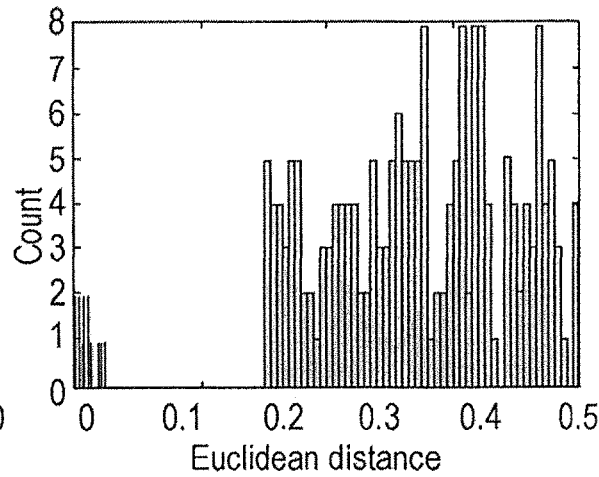
Figure 12I:
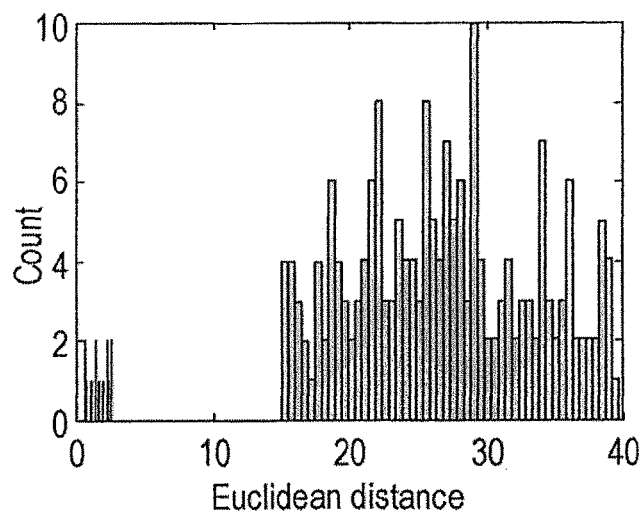

FIGS. 12(a)-12(i) illustrate exemplary graphs of pairwise Euclidean distance between speckle images across materials, including: FIG. 12(a)—translucent PVC plastic card; FIG. 12(b)—opaque PVC plastic card; FIG.12(c) woolen material; FIG. 12(d)—nylon material; FIG. 12(e)—FHD of polyester material; FIG. 12(f)—denim material; FIG. 12(g)—cotton material; FIG. 12(h)—terrycloth material; and FIG. 12(i)—glass of type 1.

According to further exemplary embodiments of the present disclosure, it is possible to consider certain exemplary[2] categories of paper in the exemplary analysis, including, e.g., (a) A4 size print paper; (b) thin notebook style paper; (c) thick print poster-style paper; (d) brown-colored binding paper. For example, twenty-five speckles can be generated for each type of paper. In each type speckles can be taken from the same region in 25 different papers. Gabor transforms can be applied to 100 speckle images and their bit sequences can be extracted. The mean µ of FHD can be 0.4869 and standard deviation σ can be 0.0055. The FHD for 100 Gabor bit sequences of "like" speckles or speckles from the same region, can have a mean=0.158 and standard deviation=0.0534. There can be a clear demarcation between same and different speckles and it c an show that the distribution of FHD of different speckles can lie near 0.5 and the distribution of same speckles can lie near 0.

For same speckles, the FHD distribution should preferably be zero, as these speckle patterns are the same. But, since the extraction of speckle can be sensitive, the FHD's are not necessarily zero. A speckle pattern extracted with same orientations and lighting conditions, may never produce identical Gabor bit sequences, due to sensitivity of speckles to minute changes in the physical environment.

In the case of plastic, according to certain exemplary embodiments, e.g., it is possible to extract, e.g., about 20 speckles from 20 translucent PVC plastic cards (one from each card) and apply Gabor transform to them to obtain Gabor bits. The same or similar number of speckles can be extracted in a second trial from the PVC plastic cards. Using FHD, the speckles extracted from the same region (e.g. same speckles), can be compared and pairs of speckles extracted from different regions (e.g., different speckles) can be compared. Mean µ and standard deviation a for same speckles can be 0.1004 and 0.0541 respectively, which can suggest that the speckles of same region are a match. µ and σ for different speckles can be 0.4755 and 0.0142 respectively, which suggests that FHD of different speckles are not a match. Similarly, we evaluate opaque PVC plastic cards and the results show that FHD of Gabor transformed speckles are statistically unique. The exemplary results are shown in graphs of FIGS. 11(a) and 11(b).

Different types of fabric such as wool, nylon, polyester, denim, cotton, acrylic, mixture of nylon and metallic and others can be evaluated. Trials can be conducted and in each trial, 20 speckles from each of the 30 different fabrics can be extracted (e.g., 20 speckles per material, where each speckle can be from a different instance of the same fabric). The speckle patterns can be extracted from the same region in each of these materials. A Gabor transform can be applied and obtain Gabor bits. In a second trial (e.g., of two trials) speckle patterns can be extracted from the same region in each of the materials. Using FHD we can compare same speckles (e.g., speckles extracted from the same region in one material) and different speckles (e.g., speckles extracted from the same region in different materials). The exemplary results for woolen, nylon, polyester, denim and cotton are illustrated in the exemplary graphs of FIGS. 11(c)-(h) respectively.

At least two types of consumer grade glass material are evaluated by the exemplary embodiments in the exemplary valuations. Both can be glass cups with manufacturer's logos etched in the glasses. These logos can serve as reference points to extract a speckle pattern from a particular region. For the first type of glass, we can perform two trials where in each trial we extract 20 speckles from 20 different glass materials (one speckle per material. The exemplary results are presented in graphs form in FIG. 11(i).

Using certain exemplary embodiments of the present disclosure, it is possible to evaluate a plywood (e.g., oak finish) table. Two trials can be conducted and in each trial 20 speckle patterns can be extracted from 20 regions in the wooden table. The µ and σ values of FHD illustrates that the speckles across this material can be unique.

Another exemplary evaluation can include extracting 20 speckle patterns from 20 different regions on the human skin. At least two trials show the µ and σ values of FHD of speckles from human skin, and it is evident from the graph that the speckles extracted from human skin are statistically unique.

With certain exemplary embodiments of the present disclosure, it is possible to evaluate the statistical properties of the fingerprint and show the histogram of Euclidean distance between pairs of same and different speckles across 22 materials. For example, all materials can be evaluated in ideal and non-ideal settings. The matching criteria can include: If the Euclidean distance between a pair of fingerprints is less than a certain threshold value, then the speckles can be regarded as similar, else they can be regarded as dissimilar.

It can be evident from the exemplary graphs of FIGS. 11(a)-11(l) that there can be a clear demarcation between same fingerprints and different fingerprints. This shows that fingerprints are unique to a physical surface and they can be authenticated with exemplary embodiments of the present disclosure. Preferably, a threshold of about 2.5 can be set; if the Euclidean distance of any pair of fingerprints is less than or equal to 2.5, then it can be a match, else it can be regarded as not being a match. But, under non-ideal conditions, the Euclidean distances for same fingerprints can move above 2.5. Therefore, a conservative threshold of 4 can be set to identify same fingerprints. This threshold can hold good under both ideal and non-ideal conditions across materials.

Exemplary Non-Ideal Conditions

Using certain exemplary embodiments of the present disclosure, the exemplary procedures can also be applied in non-ideal settings to check the robustness of speckle fingerprinting. For paper, the region near the speckle can be smudged, which can change the speckle pattern by about 10%. Plastic cards can be handled as they would in exemplary real-world conditions; e.g., by touching the speckle region multiple times. The changes in speckle pattern can be about 5-8%. For fabric, handling can be simulated by stretching the region where speckle was extracted from, try to fold it etc. This can change the original speckle by about 10-12%. For glass surfaces, water can be poured on it, the region can be cleaned and the speckle pattern from the manufacturer's logo can be extracted. The speckle pattern is changes by about 5%. For wooden surfaces, the region near the speckle pattern can be smudged. The changes to the speckle pattern can be about 10%. For skin, the hand (e.g., knuckle) can be washed with water and after it is dried, the speckle extracted. The changes to the speckle can be about 5-10%. For metals and alloys, the materials (e.g., coins) can be handled in real-world settings and then the speckles can be extracted. Then changes to the speckle can be about 5-10%.

Exemplary Physical Surface Reconstruction Problem

Given a speckle pattern and a light source, it is possible to provide with an adversary reconstruct—a physical surface that produces the same or a similar speckle pattern to create a counterfeit. To understand and define the hardness involved in reconstructing the physical surface given the speckle, a combinatorial model of multiple scattering of light can be developed, and then based on a certain assumptions prove that problem of reconstructing the physical surface given the speckle pattern is #P-hard to approximate.

Figure 6:
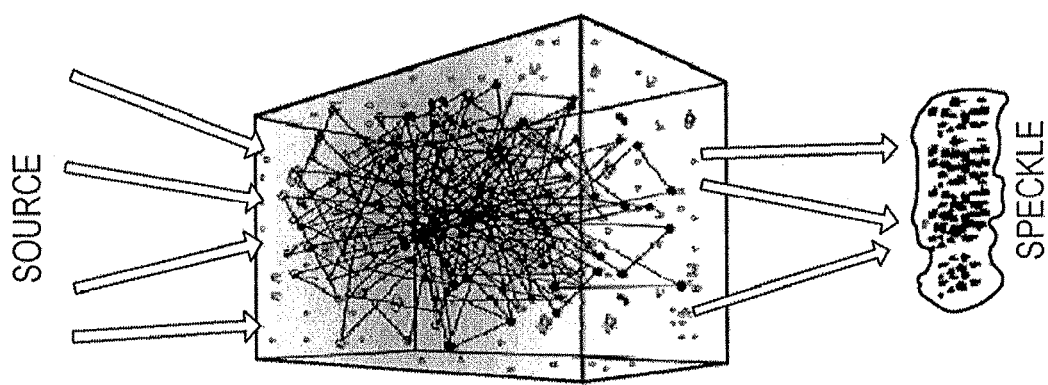
FIG. 6 is an illustration of an exemplary cube which can represent a 3D cross section of any surface.

A speckle pattern can be, e.g., a 2-dimensional representation of the multiple scattering effect of a coherent or partially coherent light source incident on a rough physical structure (as illustrated in FIG. 6). FIG. 6 shows an exemplary cube which can represent a 3D cross section of any surface, whereas a source can refer to a partially coherent light source, a speckle pattern of a right side, and dark (e.g., black) edges inside the exemplary cube representing edges that can be incident on randomly shaped particles/objects. A physical structure can be defined to be dense, when the structure size is much larger than the mean path length of the scattered waves inside the structure. For practical purposes one can visualize density based on the number of scattering particles within the structure.

Thus, e.g., let D be the resulting speckle pattern, caused due to the effect of multiple scattering of light (coherent or partially coherent) through a dense physical structure. Given a speckle pattern D and the properties of the input light source, is it possible to efficiently reconstruct (exactly or approximately) the physical structure and also the physical phenomenon of multiple scattering, to produce the same speckle pattern D'=D or an approximate speckle pattern D≈D'($\|D-D'\|_2=O(\varepsilon)$, where ε>0 is small arbitrary constant).

This problem definition basically summarizes the threat model where the adversary is given a speckle pattern D and the input light source and needs to reconstruct a physical surface that approximately matches with the speckle pattern D. Two basic assumptions can be made in this problem definition:

The adversary does not have any information about the microscopic structure of the physical object. The adversary does not have access to the physical surface that the adversary is trying to reconstruct.

The adversary can perform multiple readings of any other physical surface to obtain a speckle of that surface. But, doing so would not provide him any information in reconstructing the original physical surface.

Based on the assumptions, the adversary can preferably simulate the multiple scattering effect in order to reconstruct the object, to produce the same speckle pattern. The adversary could construct a random surface and hope that it produces the same speckle, but this is clearly not an optimal strategy. Next, some background can be provided on scattering, and based on such background, it is possible to describe an exemplary combinatorial model of multiple scattering according to a further exemplary embodiments of the present disclosure.

Exemplary Scattering Theory

The Foldy-Lax equations can be used to provide a discrete characterization of the scattering effect of light on each particle. In this section the basics of the Foldy-Lax equation are provided and in the next, a graph based model that leverages the Foldy-Lax equations is described to characterize the multiple scattering effect.

Foldy-Lax Equations:

The total electric field at a point is given by, $$E^{inc}(r,t) + \sum_{i=1}^{N} E_i^{sca}(r,t).$$

The partial sums of scattered waves can be computed by solving the Foldy-Lax equations numerically. If an exemplary medium contains non-homogeneous, arbitrarily positioned objects, then the solution can become increasingly ill-conditioned with increasing number of cluster components and their structures. Hence, certain approximations can be done to provide a much more tractable analytical equation that can be solved. The far-field version of the Foldy-Lax equation can be rewritten as, where N is the total number of particles in the medium, $B_{ri0}=G(r_1)A_i(r_i,s), B_{rij}=G(r_i)A(r_i,R_{ij}), B_{ij0}=G(R_{ij})A_j(R_{ij},s), B_{ij1}=G(R_{ij})A_j(R_{ij},R_{jl})$ where $$G(r) = e^{ikr}/r$$

From this, the order-of-scattering expansion can be determined.

The first term of Equation can be the incident field, the second term can be the sum of all single scattering contributions, the third term can be the sum of all double-scattering contributions and so on. Hence, the total field at an observation point r can be composed f the incident field and single- and multiple-scattering contributions that can be divided into two groups. The first group, can include all the contributions that correspond to self-avoiding scattering paths and; the second group can include all the contributions corresponding to the paths that go through an object/particle more than once. From these equations, what are known as ladder diagrams can be created to further approximate the scattering expression and finally obtain the Radiative Transfer Equation (RTE) that can be used in a variety of models to predict physical phenomena from interplanetary dust to properties of human tissue in medical imaging.

Exemplary Model

A combinatorial model for multiple scattering of light that builds upon the analytical ideas of scattering theory according to the exemplary embodiment of the present disclosure can be as follows. For each configuration of particles, e.g., there can exist a scatter graph G(V,E) such that it represents the scattering of incident light within the object. Let G(V,E) be a graph, where the edge weight W represents the irradiance (or intensity) of the partially scattered electric field between two vertices $(u,v) \in V$. Irradiance I can be defined as $$\frac{\varepsilon_0 rc}{2}|E|^2,$$

where E is the electromagnetic field vector, $\varepsilon_0$ is the permittivity of vacuum, r is the refractive index of the medium and c is the speed of light in vacuum. So, each edge weight $$W_i = \frac{\varepsilon_0 rc}{2}|E_{sca}|^2,$$

where $E_{sca}$ is the scattered electric field between two particles (or vertices). It can be intuitively thought of as the intensity value between two vertices or particles. Vertices are non-homogeneous particles with no specific structure: the shape, size, morphology of each $u \in V$ is independent of every $v \in V$. The edges model partially scattered light intensity, and as light collides with vertices or particles, further scattering can occur (e.g., multiple scattering). This scattering can occur until the beam(s) or light goes outside the medium. The medium can be represented in 3-dimensional space and the resulting irradiance pattern outside the medium can be a 2D matrix of real valued numbers $\mathcal{D}$. Each entry $D_{ij} \in \mathcal{D}$ can represent the total irradiance at that point. Following the Foldy-Lax far-field equation, such that each partial scattering can be summed up, the total electric field at one point $D_{ij}$ can be the summation of edge weights $$\sum_m^i W_i,$$

where m is the number of edges that span vertices $V' \in V$. Next, this exemplary model will be formally defined.

Exemplary Definition 1: For every configuration of particles, there can exist a scatter graph G(V,E). Let G(V,E) be a graph with the following properties: (i) The edge weights W are real-valued positive numbers such that $$W = \frac{\varepsilon_0 rc}{2}|E_{sca}|^2,$$

where $E_{sca}$ is the partially scattered field between vertices $u,v \in V$. ii) the vertices V are nonhomogeneous particles with arbitrary shape. iii) D is the speckle pattern, the 2D matrix of result data after the effect of scattering, in which each entry $\mathcal{E}$ (or $D_{ij}$) represents the total irradiance at that point $\mathcal{E} \in D$:

$$V_\ell \subseteq V \bigg| \sum_i^m W_i,$$

where m is the number of edges spanning $V_l$ vertices.

Several assumptions in this exemplary model can be made to help in analyzing the computational complexity issues. These can be described as follows: a) Just as graph G(V,E) influences the speckle pattern D, it can be assumed that the irradiance at a point, $D_{ij}$ or $\mathcal{E}$, is influenced by a subgraph in G. There can be disjoint sets of subgraphs (multiple subgraphs in G) that influence the irradiance $\mathcal{E}$ at a point. This can be excluded from consideration in this exemplary model. b) The edge weight W represented as the irradiance between two vertices can be represented as a real valued number. This could have been kept as a dyadic operator or as the amplitude scattering matrix S, but representing this as a number can be easier to analyze in terms of computational complexity issues. Changing W to a dyadic would not change the exemplary results, as the Foldy-Lax equations are still followed to compute the irradiance at a single point $\mathcal{E}$.

The exemplary model can introduce the Bounded Oracle, which in polynomial time determines the number of vertices that are traversed by some portion of edges. The oracle is made realistic in the sense that, given the irradiance at a point $\mathcal{E}$ and other physical parameters, the adversary could in theory put a bound on the number of particles that influenced that specific $\mathcal{E}$.

Exemplary Definition 2 (Bounded Oracle):

If n is the number of particles, $\mathcal{E}$ the irradiance at point some point f in D, then the Bounded Oracle in polynomial time, gives a bound on the number of vertices k traversed by m edges such that, $V_k \subseteq V$, $k \leq q$ where q is a positive integer.

Exemplary Theorem 1 Let n be the total number of particles/objects that is arbitrarily distributed in an either (homogeneous or non-homogeneous) medium and $1 \subseteq n$. Let D be the result 2-dimensional speckle pattern (or irradiance matrix) after multiple scattering and $\mathcal{E}$ be the irradiance at point (i,j) in D. An exemplary graph G(V,E) can be provided which can be the graph that exists due to the effect of multiple scattering through n particles. Let $W_i$ be the edge weight which is defined as the irradiance of the partially scattered electric field between two particles (or vertices) and is given by $$\frac{\varepsilon_0 rc}{2}|E_{sca}|^2$$

(where $E_{sca}$ is the scattered electric field, $\varepsilon_0$ is the permittivity of vacuum, r is the refractive index of the medium and c is the speed of light in vacuum)

Computing (or finding) an induced subgraph $H_I(V_I, E_I) \subseteq G(V, E)$ that influences or generates $\mathcal{E}$ and satisfies $$\mathcal{E} = \sum_i^m w_i$$

(where m is number of edges spanning $V_I$ vertices) is #P-hard and can be impossible to approximate unless NP=RP.

This can indicate that, given a speckle pattern, reconstructing the multiple scattering path of light within the physical structure or surface is #P-hard to approximate, (under standard complexity theoretic assumptions), as one would need to solve #Dks problem which reduces to #CLIQUE problem which is #P-hard to approximate.

The exemplary model is general and can also relate to the various computational models used in calculation of scattering effects. In Exemplary Theorem 1, no particular structure (e.g., shape, volume etc) for the particles is assumed. However, in an exemplary T-matrix method, which is one of the popular methods to compute scattering effects of nonspherical particles, the transition matrix can be independent of the incident and scattered fields and depend only on the size, orientation and refractive index of the scattering particles. So, the T-matrix can be computed once for a particle, then it can be used to compute scattering effects of that particle for all possible directions.

Foldy-Lax equations were chosen to model speckle patterns instead of other light scattering models (e.g., Bidirectional Surface Scattering Reflectance Distribution Function, Radiative Transfer, Inverse Light Transport, T-matrix), since one cannot make approximations like ignoring some of the terms in the Foldy Lax equations or limiting the number of scatterers to simulate the speckle patterns at the microscopic level; minor surface alterations can significantly alter the speckle pattern at the microscopic granularity. The analysis here represents only a specific attack scenario where the ability to reconstruct a physical surface given only the speckle pattern is analyzed.

A feature of physical fingerprinting lies in the fact that any physical surface can be authenticated in a completely offline manner since the compact code of a surface can be imprinted on the same surface to make it self-verifiable. A bank check with a speckle can be authenticated in an off-line manner without any need for data connectivity. A bank can also sign the fingerprint with its private key. A user can use the portable cellphone microscope assembly to read the speckle, compute the fingerprint and check if it matches the fingerprint on the check. If yes, then the check is not duplicated or photocopied. The user can also utilize the bank's public key to check whether fingerprint was indeed signed by the bank if the document contains an additional signature corresponding to the compact code. This mechanism can be applied to any type of paper document such as currency notes. To apply the exemplary embodiments of the present disclosure for clothing, the manufacturer can stick a speckle with a fingerprint in the fabric; signs the fingerprint and ships the clothes to the retailer. Anyone with a mobile phone microscope assembly can authenticate that piece of fabric in a completely offline manner using the exemplary embodiments of the present disclosure. Counterfeit credit cards, debit cards, ID cards or any sort of plastic cards can now be authenticated offline in a portable manner. Using certain exemplary embodiments of the present disclosure, it is possible to authenticate drug bottles, plastic containers and other materials which is used in the field of pharma and medicine, thereby reducing counterfeiting. With certain exemplary embodiments of the present disclosure, it is possible to authenticate automobile spare parts. If manufacturers embed a speckle fingerprint in every spare part, then the authenticity of the part can be checked in the auto shop when buying the spare part.

The compact nature of the fingerprint makes it possible to write the fingerprint on the object. This property can be useful in developing regions where branchless banking initiatives are accelerating. The shopkeeper acts as an agent of the bank and can provide secure receipts to the clients, by marking a region, reading the speckle, computing the fingerprint and writing the fingerprint on that piece of paper. Now the paper is self-verifiable and it can be authenticated in an offline manner. There are various ways in which according to certain exemplary embodiments of the present disclosure, the exemplary system, method and computer-accessible medium can be used in microfinance, as it can give the ability to authenticate a physical surface in a completely offline manner. The exemplary system, method and computer-accessible medium can also be used with secure sketches to provide online authentication for various materials.

Particular Exemplary Embodiments

FIG. 14 illustrates a flow diagram according to an exemplary method for authenticating a non-digital medium, such as a physical object or a portion of the physical object. Initially, e.g., at 810, an image can be captured/received of the non-digital medium, such as a marked or unmarked portion of a surface of the physical object. Once this image is received, at 820 a first microscopic image or video can be stored and the local/global descriptors can be computed using object invariant gradient histogram algorithm or, such as a combination of a Gabor transform and a Principal Component Analysis procedure.

At a later time, for verifying an authenticity of the physical object, a predetermined region can be chosen, and the processing device reads at 830. An image or video can be received for the physical object that can be captured by a microscope, such as a USB microscope or any other microscope. The microscope can be a handheld device, such a cellular telephone integrated with a microscope, or a digital camera integrated with a microscope.

The second microscopic image or video can be stored and the low dimensional representations can be computed by employing the local/global descriptor algorithms and Gabor transforms using Principal Component Analysis procedure at 840. Low dimensional representations of images are preferably generated using an invariant GaborPCA procedure but may be generated using other procedures, e.g., any procedure to reduce the dimensionality of the image data.

Then, the first microscopic image of video and the second microscopic image or video can be compared at 850. The comparison can be performed by local/global descriptors are computed using object invariant gradient histogram procedure or, such as a combination of a Gabor transform and a Principal Component Analysis procedure.

If a similarity between the first and second speckle patterns equals or exceeds a predetermined amount, then the physical object or non-digital medium can be determined to be authentic at 860. If not, the physical object is not authentic.

FIG. 15 illustrates a block diagram of an exemplary embodiment of a system according to the present disclosure. The system can be offline. The system can comprise a disconnected authentication that uses pre-determined data stored in a memory of the device. The disconnected authentication can detect an expiration date of the paper, and can be independent of any centralized authentication system. In the exemplary system, a computer 100 can be provided having a processor 130 which can be configured or programmed to perform the exemplary steps and/or procedures of the exemplary embodiments of the techniques described above. For example, a non-digital medium of a document 110 can be positioned so that an image capturing device 120 is able to capture an image of a marked portion of the non-digital medium 110. The non-digital medium 110 can be a paper that need to have its authenticity verified. The image capturing device can be a microscope, such as a USB microscope, or a cellular phone integrated with a microscope, and be connected to the computer 100 through a standard USB port. The image capturing device can also be a digital camera, which can be integrated with a microscope. The image of the non-digital medium 110 can be provided by the image capturing device 120 to the computer 100 as data, which can be transmitted to the processor 130 and/or storage arrangement 140.

According to one exemplary embodiment of the present disclosure, the data can be stored in a storage arrangement 140 (e.g., hard drive, memory device, such as RAM, ROM, memory stick, floppy drive, etc.). The storage arrangement 140 can have in it stored various speckle patterns to verify authenticity of various non-digital mediums for non-documents. The processor 130 can access the storage arrangement 140 to execute a computer program or a set of instructions (stored on or in the storage arrangement 630) which perform the procedures according to the exemplary embodiments of the present disclosure.

Thus, e.g., when the processor 130 performs such instructions and/or computer program, the processor 130 can be configured or programmed to perform the exemplary embodiments of the procedures according to the present disclosure, as described above herein. For example, the processor 130 can receive the image from the image capturing device 120 and/or the storage arrangement 140. It can extract a first speckle pattern from the image. This speckle pattern can be compared to a second speckle pattern stored in the storage arrangement 140 relating to the non-digital medium to determine if a similarity between the first and second speckle patterns equals or exceeds a predetermined amount. Depending on whether this predetermined threshold is exceeded or not, the processor can determine whether the non-digital medium 110 of the document is authentic or not.

A display 150 can also be provided for the exemplary system of FIG. 15. The storage arrangement 140 and the display 150 can be provided within the computer 100 or external from the computer 100. The information received by the processor 130 and the information determined by the processor 130, as well as the information stored on the storage arrangement 140 can be displayed on the display 150 in a user-readable format. For example, the display 150 can display whether the non-digital medium of the document 110 is authentic or not.

The foregoing merely illustrates the principles of the invention the present disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention the present disclosure and are thus within the spirit and scope of the present invention the present disclosure. In addition, to the extent that the prior art knowledge has not been explicitly incorporated by reference herein above, it is explicitly being incorporated herein in its entirety. All publications referenced herein above are incorporated herein by reference in their entireties.

What is claimed is:

1. A non-transitory computer-accessible medium having stored thereon computer-executable instructions for authenticating at least one physical object, wherein, when a computer hardware arrangement executes the instructions, the computer arrangement is configured to perform procedures comprising:
 (a) determining, a priori, settings for an imaging device;
 (b) receiving at least one of at least one first microscopic image or at least one first microscopic video of the at least one physical object based on a partially coherent light source from the imaging device;
 (c) determining at least one first set of keypoint descriptors related to at least one first microscopic texture of the at least one physical object based on the at least one of the at least one first microscopic image or the at least one first microscopic video using a fixed scale and a fixed orientation version of a scale invariant feature transform (SIFT) procedure;
 (d) receiving at least one of at least one second microscopic image or at least one second microscopic video of the at least one physical object based on the partially coherent light source;
 (e) determining at least one second set of keypoint descriptors related to at least one second microscopic texture of the at least one physical object based on the at least one of the at least one second microscopic image or the at least one second microscopic video using the fixed scale and the fixed orientation version of the SIFT procedure;
 (f) comparing at least two descriptors of the first set of keypoint descriptors with at least two descriptors of the second set of keypoint descriptors to determine matching descriptors;
 (g) obtaining a first slope of at least two of the matching descriptors, and a second slope of at least other two of the matching descriptors;
 (h) determining a set of differences of slopes comprising the first slope and the second slope and between other slopes; and
 (i) authenticating the at least one physical object based on a minimum percentage of the set of differences of the slopes.

2. The computer-accessible medium of claim 1, wherein the physical object includes a paper.

3. The computer-accessible medium of claim 1, wherein the computer arrangement is stored on at least one of a handheld computing device, a cellphone or a stationary computing device, and at least one microscope arrangement is attached to the handheld computing device, the cellphone or the stationary computing device.

4. The computer-accessible medium of claim 1, wherein the at least one first microscopic texture is from at least one of a region in the at least one physical object without a mark or at least one content of the at least one physical object.

5. The computer-accessible medium of claim 4, wherein the at least one content includes information related to at least one of at least one user or at least one object identity.

6. The computer-accessible medium of claim 1, wherein the at least one first microscopic texture is extracted from at least one region near at least one landmark, and wherein the at least one landmark is at least one content of the at least one physical object.

7. The computer-accessible medium of claim 1, wherein at least one of the at least one first microscopic texture or the at least one second microscopic texture includes at least one texture speckle pattern.

8. The computer-accessible medium of claim 1, wherein the at least one first set of keypoint descriptors and the at least one second set of keypoint descriptors include at least one of a local descriptor or a global descriptor.

9. The computer-accessible medium of claim 1, wherein the computer arrangement is further configured to (i) convert the at least one first microscopic texture, using an object invariant procedure, into a first low dimensional representation, (ii) convert the at least one second microscopic texture, using the object invariant procedure, into a second low dimensional representation, and (iii) perform a further comparison procedure by determining if a particular metric distance between the first low dimensional representation and the second low dimensional representation is within a predetermined amount, wherein the predetermined amount is determined using a mathematical function.

10. The computer-accessible medium of claim 1, wherein the computer arrangement is further configured to (i) convert the at least one first microscopic texture into first data using an object invariant, scale and rotation invariant gradient histogram feature descriptor procedure, (ii) convert the at least one second microscopic texture into second data, using the object invariant, scale and rotation invariant gradient histogram feature descriptor procedure, and (iii) determine the similarity measure by determining if a certain metric distance between the first data and the second data is within a predetermined amount, wherein the predetermined amount is determined using a mathematical function.

11. The computer-accessible medium of claim 1, wherein the partially coherent light source is at least one of a visible, an infra-red, an ultra-violet or a combination thereof, which is configured to provide a multispectral electromagnetic radiation.

12. The computer-accessible medium of claim 1, wherein the at least one physical object is at least one of aged, tampered, crumpled or soaked.

13. The computer-accessible medium of claim 9, wherein the computer arrangement is further configured to cause the first low dimensional representation to be printed on the at least one physical object.

14. The computer-accessible medium of claim 1, wherein computer arrangement is further configured to authenticate the at least one physical object using at least one of a secret key cryptography procedure or a public key cryptography procedure.

15. The computer-accessible medium of claim 1, wherein the computer arrangement is further configured to store the at least one first microscopic texture and the at least one descriptor as data in an online repository.

16. The computer-accessible medium of claim 1, wherein the computer arrangement is further configured to perform the authentication procedure by comparing a first portion of the at least one first microscopic texture to a second portion of the at least one second microscopic texture, wherein the first portion is less than an entirety of the at least one first microscopic texture and the second portion is less than the entirety of the at least one second microscopic texture.

17. The computer-accessible medium of claim 1, wherein (i) the at least one physical object is a particular physical object, and (ii) the at least one first microscopic texture is a unique identification of only the particular physical object.

18. A method for authenticating at least one physical object comprising:
(a) determining, a priori, settings for an imaging device;
(b) receiving at least one of at least one first microscopic image or at least one first microscopic video of the at least one physical object based on a partially coherent light source from the imaging device;
(c) determining at least one first set of keypoint descriptors related to at least one first microscopic texture of the at least one physical object based on the at least one of the at least one first microscopic image or the at least one first microscopic video using a fixed scale and a fixed orientation version of a scale invariant feature transform (SIFT) procedure;
(d) receiving at least one of at least one second microscopic image or at least one second microscopic video of the at least one physical object based on the partially coherent light source;
(e) determining at least one second set of keypoint descriptors related to at least one second microscopic texture of the at least one physical object based on the at least one of the at least one second microscopic image or the at least one second microscopic video using the fixed scale and the fixed orientation version of the SIFT procedure;
(f) comparing at least two descriptors of the first set of keypoint descriptors with at least two descriptors of the second set of keypoint descriptors to determine matching descriptors;
(g) obtaining a first slope of at least two of the matching descriptors, and a second slope of at least other two of the matching descriptors;
(h) determining a set of differences of slopes comprising the first slope and the second slope and between other slopes; and
(i) authenticating the at least one physical object based on a minimum percentage of the set of differences of the slopes.

19. The method of claim 18, further comprising extracting the at least one first microscopic texture by moving a microscope in a predefined region, wherein the predefined region is determined based on at least one of a coordinate reference frame tracking system or a manual operation.

20. The method of claim 18, further comprising extracting the at least one first microscopic texture using a non-invasive procedure that does not contact a surface of the at least one physical object.

21. The method of claim 18, further comprising extracting the at least one second microscopic texture using at least one microscope, wherein an angle and distance of the partially coherent light source is fixed based on a predetermined amount, and wherein a further angle and distance of the microscope is fixed based on a further predetermined amount, and wherein the first predetermined amount and the further predetermined amount are based on a mathematical function.

22. The method of claim 18, wherein the partially coherent light source includes a polarizer.

23. The method of claim 18, wherein the partially coherent light source is provided in a mobile phone attached to at least one microscope, and wherein the at least one microscope includes at least one of a handheld microscope, a handheld Universal Serial Bus microscope or a wireless compatible microscope.

24. The method of claim 18, wherein the partially coherent light source is provided in at least one microscope attached to at least one of a robotic arm or a computer numerical controller.

25. The method of claim 18, wherein the at least one first microscopic texture is selected based on at least one of a manual tracking or an automated tracking in a reference coordinate system.

26. The method of claim 18, wherein (i) the at least one physical object is a particular physical object, and (ii) the first microscopic texture is a unique identification of only the particular physical object.

27. The method of claim 18, further comprising extracting the at least one first microscopic texture from a first curve along a surface of the at least one physical object, and extracting the at least one second microscopic texture from a second curve along the surface of the at least one physical object, the second curve being similar to the first curve, wherein the second curve is predetermined at least one of using a mathematical function or received from at least one of at least one user specific motion or at least one user specific signature.

28. A system for authenticating at least one physical object comprising:
   at least one computer hardware arrangement configured to:
   (a) determine, a priori, settings for an imaging device;
   (b) receive at least one of at least one first microscopic image or at least one first microscopic video of the at least one physical object based on a partially coherent light source from the imaging device;
   (c) determine at least one first set of keypoint descriptors related to at least one first microscopic texture of the at least one physical object based on the at least one of the at least one first microscopic image or the at least one first microscopic video using a fixed scale and a fixed orientation version of a scale invariant feature transform (SIFT) procedure;
   (d) receive at least one of at least one second microscopic image or at least one second microscopic video of the at least one physical object based on the partially coherent light source;
   (e) determine at least one second set of keypoint descriptors related to at least one second microscopic texture of the at least one physical object based on the at least one of the at least one second microscopic image or the at least one second microscopic video using the fixed scale and the fixed orientation version of the SIFT procedure;
   (f) compare at least two descriptors of the first set of keypoint descriptors with at least two descriptors of the second set of keypoint descriptors to determine matching descriptors;
   (g) obtain a first slope of at least two of the matching descriptors, and a second slope of at least other two of the matching descriptors;
   (h) determine a set of differences of slopes comprising the first slope and the second slope and between other slopes; and
   (i) authenticate the at least one physical object based on a minimum percentage of the set of differences of the slopes.

29. The computer-accessible medium of claim 1, wherein the physical object includes at least one of a fabric, a plastic, a canvas, a glass, a metal, a metal composite or an alloy.

30. The method of claim 18, wherein the physical object includes at least one of a fabric, a plastic, a canvas, a glass, a metal, a metal composite or an alloy.

31. The system of claim 28, wherein the physical object includes at least one of a fabric, a plastic, a canvas, a glass, a metal, a metal composite or an alloy.

32. The computer-accessible medium of claim 1, wherein at least two of the descriptors are definable as at least two of the matching descriptors if Euclidean distances between the at least two descriptors of the first set of keypoint descriptors and the at least two descriptors of the second set of keypoint descriptors are within a threshold.

33. The computer-accessible medium of claim 1, wherein the set of differences of the slopes is a set of differences of all of the slopes.

34. The computer-accessible medium of claim 1, wherein the set of differences of the slopes is determined based on a differences of each of the slopes and every other one of the slopes.

* * * * *